United States Patent
Tzikas et al.

[11] Patent Number: 6,160,101
[45] Date of Patent: Dec. 12, 2000

[54] AZO DYES, THEIR PREPARATION AND THEIR USE

[75] Inventors: Athanassios Tzikas, Pratteln, Switzerland; Rolf Deitz, Grenzach-Wyhlen, Germany

[73] Assignee: Ciba Specialty Chemicals Corporation, Tarrytown, N.Y.

[21] Appl. No.: 09/519,304

[22] Filed: Mar. 6, 2000

[51] Int. Cl.⁷ .......... C09B 62/513; C09B 62/09; C09B 62/25; D06P 1/38
[52] U.S. Cl. .......... 534/634; 534/635; 534/637; 534/642
[58] Field of Search .................. 534/634, 635, 534/637, 642

[56] References Cited

PUBLICATIONS

Stepanova et al., Chemical Abstracts, 97:162482, 1982.
Zeman, Chemical Abstracts, 100:6526, 1984.

*Primary Examiner*—Fiona T. Powers
*Attorney, Agent, or Firm*—Kevin T. Mansfield

[57] ABSTRACT

Azo dyes comprising at least one structural unit of the formula (1)

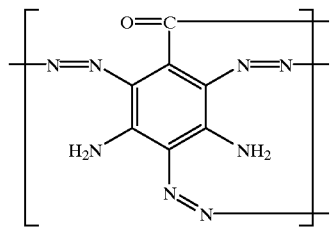

(1)

The azo dyes according to the invention are particularly suitable for dyeing cotton and wool and produce dyeings with good allround properties.

14 Claims, No Drawings

AZO DYES, THEIR PREPARATION AND THEIR USE

The present invention relates to novel azo dyes, processes for their preparation and their use.

The practice of dyeing has recently lead to increased requirements regarding the quality of the dyeings and the profitability of the dyeing process. There consequently continues to be a demand for novel, readily accessible dyes which have good properties, in particular in respect of application.

In the case of fibre-reactive dyes, those dyes, for example, which have an adequate substantivity and at the same time a good ease of washing off unfixed portions are required nowadays. They should furthermore have a good tinctorial yield and a high reactivity, and in particular dyeings with high degrees of fixing should be delivered. These requirements are not met with regard to all the properties by the known dyes.

The present invention is therefore based on the object of discovering novel azo dyes, in particular for dyeing and printing fibre materials, which have the qualities characterized above to a high degree. They should produce dyeings with good allround properties, for example light and wet fastness properties.

The present invention thus relates to azo dyes containing at least one structural unit of the formula (1)

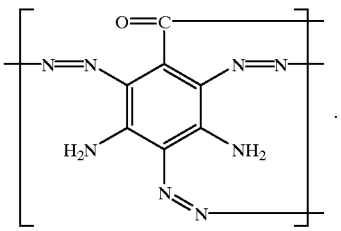

(1)

The azo dyes according to the invention can belong to various classes of dye, according to their tinctorial use. These classes of dye are described, for example, in Venkataraman "The Chemistry of Synthetic Dyes" Volume 1, pages 268–303, Academic Press, New York, London 1952 and Volume 6, pages 1–4, Academic Press, New York, London 1972. The azo dyes according to the invention are preferably acid, direct or reactive dyes for dyeing cotton, wool, leather, paper and wood, and in particular reactive dyes for dyeing cotton and wool, i.e. they contain at least one, and preferably at least two, fibre-reactive groups and are capable of reacting with the hydroxyl groups of cellulose or with the reactive centres of natural and synthetic polyamides to form covalent chemical bonds.

The azo dyes according to the invention preferably have the formula (2), (3) or (4)

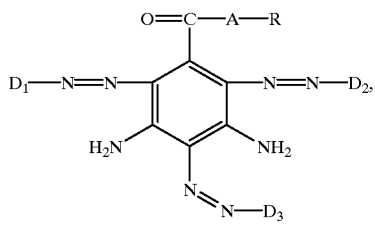

(2)

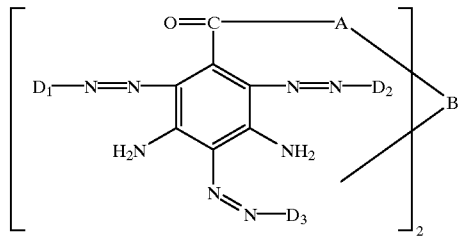

(3)

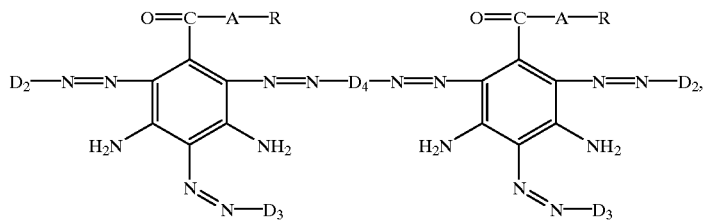

(4)

in which

A is oxygen, sulfur or a radical —NR'— and R' is hydrogen or $C_1$–$C_{12}$alkyl which is substituted or unsubstituted or may be interrupted by oxygen, B is an aliphatic or aromatic bridge member, $D_1$, $D_2$ and $D_3$ independently of one another are each the radical of a diazo component of the benzene or naphthalene series, $D_4$ is the radical of an aromatic tetrazo component and R is hydrogen or an aliphatic or aromatic radical, or the radicals R and R', together with the nitrogen atom, form a heterocyclic radical.

$C_1$–$C_{12}$Alkyl, preferably $C_1$–$C_6$alkyl, and in particular $C_1$–$C_4$alkyl, as R' which is substituted or unsubstituted or may be interrupted by oxygen is straight-chain or branched and is, for example, methyl, ethyl, n- or isopropyl, n-, iso-, sec- or tert-butyl, n-pentyl, neo-pentyl, n-hexyl, n-heptyl, n-octyl, n-nonyl, n-decyl, n-undecyl or n-dodecyl. The alkyl radicals mentioned can be interrupted by 1, 2 or 3 oxygen atoms and are unsubstituted or substituted by $C_2$–$C_4$alkanoylamino, for example acetylamino or propionylamino; $C_1$–$C_4$alkoxy, for example methoxy or ethoxy; hydroxyl; sulfo; sulfato; carboxyl; cyano; or carbamoyl, sulfamoyl, β-sulfatoethylsulfonyl or β-chloroethylsulfonyl. Preferred substituents of the alkyl radicals R' are hydroxyl, sulfo, carboxyl or sulfato, in particular hydroxyl or sulfato, and especially hydroxyl. Examples of the substituted alkyl radicals and the alkyl radicals interrupted by oxygen are: β-hydroxyethyl, 2-(β-hydroxyethoxy)ethyl, 2-[2-(β-hydroxyethoxy)ethoxy]ethyl, 2-(β-chloroethylsulfonyl) ethyl, 2-(β-sulfatoethylsulfonyl)ethyl, β-sulfatoethyl, β-sulfoethyl, carboxymethyl or β-carboxyethyl.

R' is preferably hydrogen.

An aliphatic bridge member B is, for example, a $C_2$–$C_{12}$alkylene radical, in particular a $C_2$–$C_6$alkylene radical, which can be interrupted by 1, 2 or 3 members from the group consisting of —NH—, —N(CH$_3$)— and, in particular, —O— and is unsubstituted or substituted by hydroxyl, sulfo, sulfato, cyano or carboxyl. Preferred substituents of the alkylene radicals B are hydroxyl, sulfo or sulfato, in particular hydroxyl.

Aliphatic bridge members B are furthermore, for example, $C_5$–$C_9$cycloalkylene radicals, such as, in particular, cyclohexylene radicals. The cycloalkylene radicals mentioned can be unsubstituted or substituted by $C_1$–$C_4$alkyl, $C_1$–$C_4$alkoxy, $C_2$–$C_4$alkanoylamino, sulfo, halogen or carboxyl, in particular by $C_1$–$C_4$alkyl. Aliphatic bridge members B are furthermore methylene-cyclohexylene, ethylene-cyclohexylene or methylene-cyclohexylene-methylene radicals which are unsubstituted or substituted in the cyclohexylene ring by $C_1$–$C_4$alkyl, in particular methyl.

An aromatic bridge member B is, for example, $C_1$–$C_6$alkylenephenylene, for example methylenephenylene, $C_1$–$C_4$alkylenephenylene-$C_1$–$C_4$alkylene, for example methylenephenylenemethylene, or phenylene which are unsubstituted or substituted by $C_1$–$C_4$alkyl, $C_1$–$C_4$alkoxy, $C_2$–$C_4$alkanoylamino, sulfo, halogen or carboxyl, or a radical of the formula

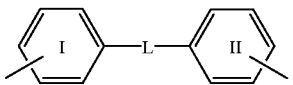

(5)

in which the benzene rings I and II are unsubstituted or substituted by $C_1$–$C_4$alkyl, $C_1$–$C_4$alkoxy, $C_2$–$C_4$alkanoylamino, sulfo, halogen or carboxyl and L is the direct bond or a $C_2$–$C_{10}$alkylene radical, which can be interrupted by 1, 2 or 3 oxygen atoms, or L is a bridge member of the formula —CH=CH—, —N=N—, —NH—, —CO—, —NH—CO—, —NH—SO$_2$—, —NH—CO—NH—, —O—, —S— or —SO$_2$—. The aromatic bridge members B mentioned are preferably unsubstituted or substituted by sulfo.

If A is oxygen in the dye of the formula (3), an aromatic bridge member B is preferably a radical of the formula (5) in which the benzene rings I and II are unsubstituted or substituted as defined above and L is as defined and preferred above. Preferably, the benzene rings I and II are unsubstituted and L is isopropylene.

B is preferably a $C_2$–$C_{12}$alkylene radical, in particular a $C_2$–$C_6$alkylene radical, which can be interrupted by 1, 2 or 3 members —O— and is unsubstituted or substituted by hydroxyl or sulfato.

Substituents of the radicals $D_1$, $D_2$ and $D_3$ are the substituents customary for azo dyes. Examples are the following: $C_1$–$C_4$alkyl, which is to be understood as meaning methyl, ethyl, n- or iso-propyl, n-, iso-, sec- or tert-butyl; $C_1$–$C_4$alkoxy, which is to be understood as meaning methoxy, ethoxy, n- or iso-propoxy or n-, iso-, sec- or tert-butoxy; hydroxy-$C_1$–$C_4$alkoxy; phenoxy; $C_2$–$C_6$-alkanoylamino which is unsubstituted or substituted in the alkyl moiety by hydroxyl or $C_1$–$C_4$alkoxy, for example acetylamino, hydroxyacetylamino, methoxyacetylamino or propionylamino; benzoylamino which is unsubstituted or substituted in the phenyl moiety by hydroxyl, sulfo, halogen, $C_1$–$C_4$alkyl or $C_1$–$C_4$alkoxy; $C_1$–$C_6$alkoxycarbonylamino which is unsubstituted or substituted in the alkyl moiety by hydroxyl, $C_1$–$C_4$alkyl or $C_1$–$C_4$alkoxy; phenoxycarbonylamino, which is unsubstituted or substituted in the phenyl moiety by hydroxyl, $C_1$–$C_4$alkyl or $C_1$–$C_4$alkoxy; amino; N—$C_1$–$C_4$alkyl- or N,N-di-$C_1$–$C_4$alkylamino which are unsubstituted or substituted in the alkyl moiety by hydroxyl, $C_1$–$C_4$alkoxy, carboxyl, cyano, halogen, sulfo, sulfato, phenyl or sulfophenyl, for example methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-ethyl-N-(3-sulfobenzyl)amino or N-(β-sulfoethyl)-N-benzylamino; cyclohexylamino; N-phenylamino or N-$C_1$–$C_4$alkyl-N-phenylamino which are unsubstituted or substituted in the phenyl moiety by nitro, $C_1$–$C_4$alkyl, $C_1$–$C_4$alkoxy, carboxyl, halogen or sulfo; $C_1$–$C_4$alkoxycarbonyl, for example methoxy- or ethoxycarbonyl; tifluoromethyl; nitro; cyano; halogen, which is generally to be understood as meaning, for example, fluorine, bromine or, in particular, chlorine; ureido; hydroxyl; carboxyl; sulfo; sulfomethyl; carbamoyl; carbamido; sulfamoyl; N-phenylsulfamoyl or N—$C_1$–$C_4$alkyl-N-phenylsulfamoyl which are unsubstituted or substituted in the phenyl moiety by sulfo or carboxyl; and methyl- or ethylsulfonyl.

Fibre-reactive radicals are also possible substituents of the radicals $D_1$, $D_2$ and $D_3$.

Fibre-reactive radicals are to be understood as meaning those which are capable of reacting with the hydroxyl groups of cellulose, the amino, carboxyl, hydroxyl and thiol groups in wool and silk, or with the amino and possibly carboxyl groups of synthetic polyamides, to form covalent chemical bonds. The fibre-reactive radicals are as a rule bonded to the dye radical directly or via a bridge member. Suitable fibre-reactive radicals are, for example, those which contain at least one substituent which can be split off on an aliphatic, aromatic or heterocyclic radical, or in which the radicals mentioned contain a radical which is capable of reaction with the fibre material, for example a vinyl radical.

A fibre-reactive radical contained in $D_1$, $D_2$ and $D_3$ preferably has the formula (6a), (6b), (6c), (6d), (6e), (6f) or (6g)

—$SO_2$—Y    (6a),

—NH—CO—$(CH_2)_l$—$SO_2$—Y    (6b),

—$CONR_2$—$(CH_2)_m$—$SO_2$—Y    (6c),

—NH—CO—CH(Hal)—$CH_2$—Hal    (6d),

—NH—CO—C(Hal)=$CH_2$    (6e), (6f)

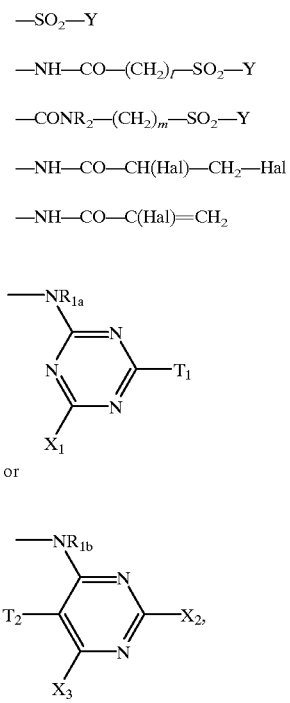

or (6g)

in which

Hal is chlorine or bromine;

$X_1$ is halogen, 3-carboxypyridin-1-yl or 3-carbamoylpyridin-1-yl;

$T_1$ independently has the meaning of $X_1$, or is a substituent which is not fibre-reactive or a fibre-reactive radical of the formula (7a), (7b), (7c), (7d), (7e) or (7f)

(7a)

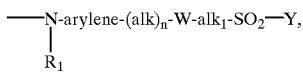

(7b)

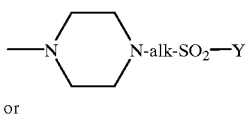

(7c)

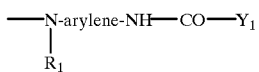

-continued (7d)

—N-arylene-(alk)$_n$-W-alk$_1$-$SO_2$—Y,
|
$R_1$ (7e)

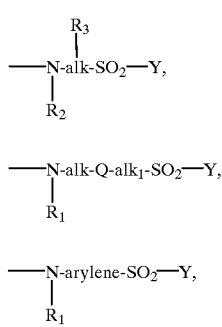

or (7f)

—N-arylene-NH—CO—$Y_1$
|
$R_1$ in which $R_1$, $R_{1a}$ and $R_{1b}$ independently of one another are each hydrogen or $C_1$–$C_4$alkyl, $R_2$ is hydrogen, $C_1$–$C_4$alkyl which is unsubstituted or substituted by hydroxyl, sulfo, sulfato, carboxyl or cyano or a radical

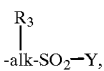
-alk-$SO_2$—Y, $R_3$ is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —$SO_2$—Y, alk and alk$_1$ independently of one another are linear or branched $C_1$–$C_6$alkylene, arylene is a phenylene or naphthylene radical which is unsubstituted or substituted by sulfo, carboxyl, $C_1$–$C_4$alkyl, $C_1$–$C_4$alkoxy or halogen, Q is a radical —O— or —$NR_1$—, in which $R_1$ is as defined above, W is a group —$SO_2$—$NR_2$—, —$CONR_2$— or —$NR_2CO$—, in which $R_2$ is as defined above, Y is vinyl or a radical —$CH_2$—$CH_2$—U and U is a group which can be split off under alkaline conditions, $Y_1$ is a group —CH(Hal)—$CH_2$—Hal or —C(Hal)=$CH_2$ and Hal is chlorine or bromine and l and m independently of one another are an integer from 1 to 6 and n is the number 0 or 1; and $X_2$ is halogen or $C_1$–$C_4$alkylsulfonyl;

$X_3$ is halogen or $C_1$–$C_4$alkyl and $T_2$ is hydrogen, cyano or halogen.

A group U which can be split off under alkaline conditions is, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N($C_1$–$C_4$alkyl)$_2$. U is preferably a group of the formula —Cl, —$OSO_3H$, —$SSO_3H$, —OCO—$CH_3$, —OCO—$C_6H_5$ or —$OPO_3H_2$, in particular —Cl or —$OSO_3H$, and particularly preferably —$OSO_3H$.

Examples of suitable radicals Y are accordingly vinyl, β-bromo- or β-chloroethyl, β-acetoxyethyl, β-benzoyloxyethyl, β-phosphatoethyl, β-sulfatoethyl and β-thiosulfatoethyl. Y is preferably vinyl, β-chloroethyl or β-sulfatoethyl, and in particular vinyl or β-sulfatoethyl.

$R_1$, $R_{1a}$ and $R_{1b}$ independently of one another are each preferably hydrogen, methyl or ethyl, and particularly preferably hydrogen.

$R_2$ is preferably hydrogen or $C_1$–$C_4$alkyl, such as methyl, ethyl, propyl, isopropyl, butyl, isobutyl, sec-butyl or tert-butyl, and particularly preferably hydrogen, methyl or ethyl. $R_2$ is particularly preferably hydrogen.

$R_3$ is preferably hydrogen.

l and m independently of one another are preferably the number 2, 3 or 4, and particularly preferably the number 2 or 3.

Especially preferably, l is the number 3 and m is the number 2.

Substituents $T_1$ which are not fibre-reactive are, for example, the following radicals:

hydroxyl;

$C_1$–$C_4$alkoxy, for example methoxy, ethoxy, n- or isopropoxy or n-, sec-, iso- or tert-butoxy, in particular methoxy or ethoxy; the radicals mentioned are unsubstituted or substituted in the alkyl moiety, for example by $C_1$–$C_4$alkoxy, hydroxyl, sulfo or carboxyl;

$C_1$–$C_4$alkylthio, for example methylthio, ethylthio, n- or isopropylthio or n-butylthio; the radicals mentioned are unsubstituted or substituted in the alkyl moiety, for example by $C_1$–$C_4$alkoxy, hydroxyl, sulfo or carboxyl;

amino;

N-mono- or N,N-di-$C_1$–$C_6$alkylamino, preferably N-mono- or N,N-di-$C_1$–$C_4$alkylamino; the radicals mentioned are unsubstituted, uninterrupted or interrupted in the alkyl moiety by oxygen or substituted in the alkyl moiety, for example by $C_2$–$C_4$alkanoylamino, $C_1$–$C_4$alkoxy, hydroxyl, sulfo, sulfato, carboxyl, cyano, carbamoyl or sulfamoyl; examples are N-methylamino, N-ethylamino, N-propylamino, N,N-di-methylamino or N,N-di-ethylamino, N-β-hydroxyethylamino, N,N-di-β-hydroxyethylamino, N-2-(β-hydroxyethoxy)ethylamino, N-2-[2-(β-hydroxyethoxy)ethoxy]ethylamino, N-β-sulfatoethylamino, N-β-sulfoethylamino, N-carboxymethylamino, N-β-carboxyethylamino, N-α,β-dicarboxyethylamino, N-α,γ-dicarboxypropylamino, N-ethyl-N-β-hydroxyethylamino or N-methyl-N-β-hydroxyethylamino;

$C_5$–$C_7$cycloalkylamino, for example cyclohexylamino, which includes both the unsubstituted radicals and the radicals substituted in the cycloalkyl ring, for example by $C_1$–$C_4$alkyl, in particular methyl, or carboxyl;

phenylamino or N—$C_1$–$C_4$alkyl-N-phenylamino, which includes both the unsubstituted radicals and the radicals substituted in the phenyl ring, for example by $C_1$–$C_4$alkyl, $C_1$–$C_4$alkoxy, $C_2$–$C_4$alkanoylamino, carboxyl, carbamoyl, sulfo or halogen, for example 2-, 3- or 4-chlorophenylamino, 2-, 3- or 4-methylphenylamino, 2-, 3- or 4-methoxyphenylamino, 2-, 3- or 4-sulfophenylamino, disulfophenylamino or 2-, 3- or 4-carboxyphenylamino;

naphthylamino which is unsubstituted or substituted in the naphthyl ring, for example by sulfo, preferably the radicals substituted by 1 to 3 sulfo groups, for example 1- or 2-naphthylamino, 1-sulfo-2-naphthylamino, 1,5-disulfo-2-naphthylamino or 4,8-disulfo-2-naphthylamino; or benzylamino which is unsubstituted or substituted in the phenyl moiety, for example by $C_1$–$C_4$alkyl, $C_1$–$C_4$alkoxy, carboxyl, sulfo or halogen.

A radical $T_1$ which is not fibre-reactive is preferably $C_1$–$C_4$alkoxy, $C_1$–$C_4$alkylthio, hydroxyl, amino, N-mono- or N,N-di-$C_1$–$C_4$alkylamino which are optionally substituted in the alkyl moiety by hydroxyl, sulfato or sulfo, morpholino, phenylamino or N—$C_1$–$C_4$alkyl-N-phenylamino which are unsubstituted or substituted in the phenyl ring by sulfo, carboxyl, acetylamino, chlorine, methyl or methoxy and in which the alkyl is unsubstituted or substituted by hydroxyl, sulfo or sulfato, or naphthylamino which is unsubstituted or substituted by 1 to 3 sulfo groups.

Particularly preferred radicals $T_1$ which are not fibre-reactive are amino, N-methylamino, N-ethylamino, N-β-hydroxyethylamino, N-methyl-N-β-hydroxyethylamino, N-ethy-N-β-hydroxyethylamino, N,N-di-β-hydroxyethylamino, morpholino, 2-, 3- or 4-carboxyphenylamino, 2-, 3- or 4-sulfophenylamino or N—$C_1$–$C_4$-alkyl-N-phenylamino.

$X_1$ is preferably halogen, for example fluorine, chlorine or bromine, and particularly preferably chlorine or fluorine.

Halogen $T_2$, $X_2$ and $X_3$ are, for example, fluorine, chlorine or bromine, in particular chlorine or fluorine.

$C_1$–$C_4$Alkylsulfonyl $X_2$ is, for example, ethylsulfonyl or methylsulfonyl, and in particular methylsulfonyl.

$C_1$–$C_4$alkyl $X_3$ is, for example, methyl, ethyl, n- or iso-propyl or n-, iso or tert-butyl, and in particular methyl.

$X_2$ and $X_3$ independently of one another are preferably chlorine or fluorine.

$T_2$ is preferably cyano or chlorine.

Hal is preferably bromine.

alk and $alk_1$ independently of one another are, for example, a methylene, ethylene, 1,3-propylene, 1,4-butylene, 1,5-pentylene or 1,6-hexylene radical or branched isomers thereof.

alk and $alk_1$ independently of one another are preferably each a $C_1$–$C_4$alkylene radical, and particularly preferably an ethylene radical or propylene radical.

arylene is preferably a 1,3- or 1,4-phenylene radical which is unsubstituted or substituted, for example by sulfo, methyl, methoxy or carboxyl, and particularly preferably an unsubstituted 1,3- or 1,4-phenylene radical.

Q is preferably —NH— or —O—, and particularly preferably —O—.

W is preferably a group of the formula —CONH— or —NHCO—, in particular a group of the formula —CONH—.

n is preferably the number 0.

The reactive radicals of the formulae (7a) to (7f) are preferably those in which W is a group of the formula —CONH—, $R_1$, $R_2$ and $R_3$ are each hydrogen, Q is the radical —O— or —NH—, alk and $alk_1$ independently of one another are each ethylene or propylene, arylene is phenylene which is unsubstituted or substituted by methyl, methoxy, carboxyl or sulfo, Y is vinyl or β-sulfatoethyl, $Y_1$ is —CHBr—$CH_2$Br or —CBr=$CH_2$ and n is the number 0.

A fibre-reactive radical contained in $D_1$, $D_2$ and $D_3$ is particularly preferably a radical of the formula (6a), (6c), (6d), (6e) or (6f), in which Y is vinyl, β-chloroethyl or β-sulfatoethyl, Hal is bromine, $R_2$ and $R_{1a}$ are hydrogen, m is the number 2 or 3, $X_1$ is halogen, $T_1$ is $C_1$–$C_4$alkoxy, $C_1$–$C_4$alkylthio, hydroxyl, amino, N-mono- or N,N-di-$C_1$–$C_4$alkylamino which are unsubstituted or substituted in the alkyl moiety by hydroxyl, sulfato or sulfo, morpholino, phenylamino or N—$C_1$–$C_4$alkyl-N-phenylamino which are unsubstituted or substituted in the phenyl ring by sulfo, carboxyl, acetylamino, chlorine, methyl or methoxy and in which the alkyl is unsubstituted or substituted by hydroxyl, sulfo or sulfato, or naphthylamino which is unsubstituted or substituted by 1 to 3 sulfo groups, or a fibre-reactive radical of the formula (7a'), (7b'), (7c'), (7d') or (7f')

$$—NH—(CH_2)_{2-3}—SO_2Y \qquad (7a'),$$

$$—NH—(CH_2)_{2-3}—O—(CH_2)_{2-3}—SO_2Y \qquad (7b'),$$

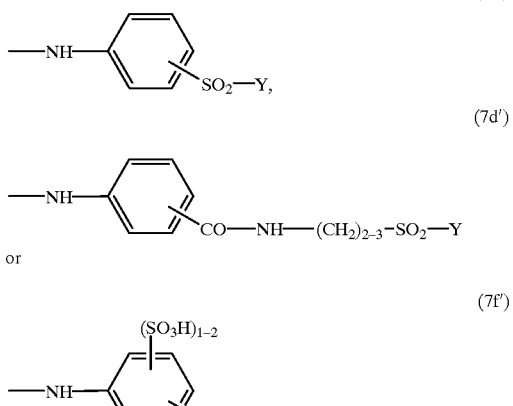

in particular (7c') or (7d'), in which
Y is as defined above and
$Y_1$ is a group —CH(Br)—CH$_2$—Br or —C(Br)=CH$_2$,
In the case of the radicals of the formulae (7a') and (7b'), Y is preferably β-chloroethyl. In the case of the radicals of the formulae (7c') and (7d'), Y is preferably vinyl or β-sulfatoethyl.

A particular embodiment of the present invention relates to dyes in which a radical contained in $D_1$, $D_2$ and $D_3$ has the formula (6h)

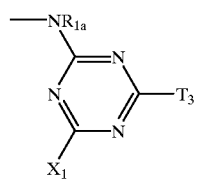

(6h)

in which
$R_{1a}$ and $X_1$ are as defined and preferred above and
$T_3$ is a monoazo- or disazoamino radical of the formula (8) or (9)

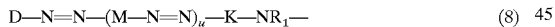 (8)

or

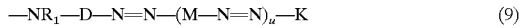 (9)

in which
D is the radical of a diazo component of the benzene or naphthalene series,
M is the radical of a middle component of the benzene or naphthalene series,
K is the radical of a coupling component of the benzene, naphthalene, pyrazolone, 6-hydroxypyrid-2-one or acetoacetic acid arylamide series,
$R_1$ is as defined and preferred above and
u is the number 0 or 1, where D, M and K can carry the substituents customary in azo dyes.

The term "substituents customary in azo dyes" means both fibre-reactive substituents and substituents which are not fibre-reactive, for example the substituents defined above for $D_1$, $D_2$ and $D_3$.

Substituents for D, M and K in $T_3$ which are not fibre-reactive are preferably $C_1$–$C_4$alkyl or $C_1$–$C_4$alkoxy which are unsubstituted or further substituted by hydroxyl, sulfo or sulfato, halogen, carboxyl, sulfo, nitro, cyano, trifluoromethyl, sulfamoyl, carbamoyl, amino, ureido, hydroxyl, sulfomethyl, $C_2$–$C_4$alkanoylamino, benzoylamino which is unsubstituted or substituted in the phenyl ring by $C_1$–$C_4$alkyl, $C_1$–$C_4$alkoxy, halogen or sulfo or phenyl which is unsubstituted or substituted by $C_1$–$C_4$alkyl, $C_1$–$C_4$alkoxy, halogen, carboxyl or sulfo.

The monoazo- or disazoamino radicals of the formula (8) or (9) preferably contain at least one sulfo group.

Preferred monoazo- or disazoamino radicals $T_3$ are the radicals of the formula (10a), (10b), (10c), (10d), (10e), (10f), (10g), (10h), (10i), (10j), (10k), (10l), (10m), (10n), (10o) or (10p)

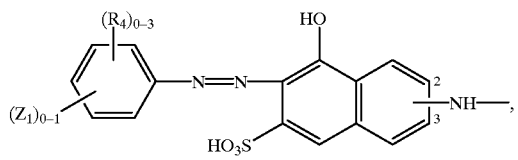

(10a)

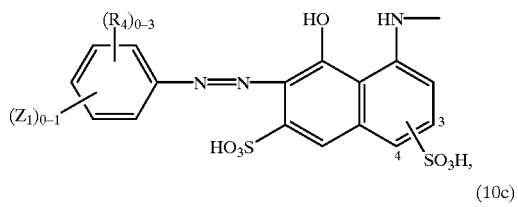

(10b)

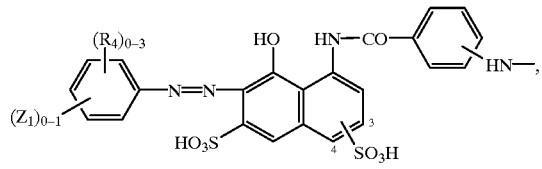

(10c)

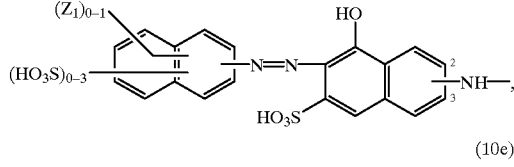

(10d)

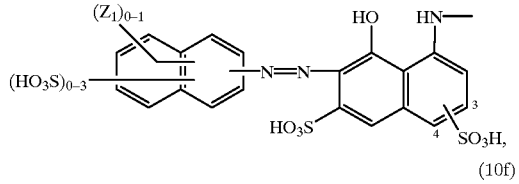

(10e)

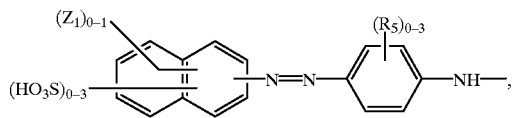

(10f)

in which
$(R_4)_{0-3}$ is 0 to 3 identical or different substituents from the group consisting of $C_1$–$C_4$alkyl, $C_1$–$C_4$alkoxy, halogen, carboxyl and sulfo,
$(R_5)_{0-3}$ is 0 to 3 identical or different substituents from the group consisting of halogen, nitro, cyano, trifluoromethyl, sulfamoyl, carbamoyl, $C_1$–$C_4$alkyl, $C_1$–$C_4$alkoxy which is unsubstituted or substituted by hydroxyl, sulfato or $C_1$–$C_4$alkoxy, amino, $C_2$–$C_4$alkanoylamino, ureido, hydroxyl, carboxyl, sulfomethyl, $C_1$–$C_4$alkylsulfonylamino and sulfo and $Z_1$ is a radical of the formula (6a), (6c), (6d), (6e), (6f) or (6g), preferably (6a), (6c), (6d) or (6e), and in particular (6a), where the radicals mentioned are as defined and preferred above,

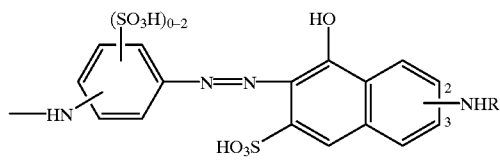
(10g)

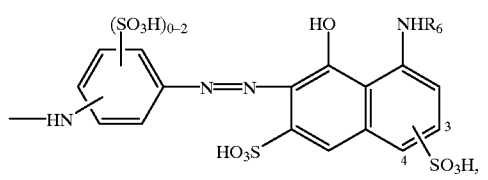
(10h)

in which $R_6$ is $C_2$–$C_4$alkanoyl or benzoyl,

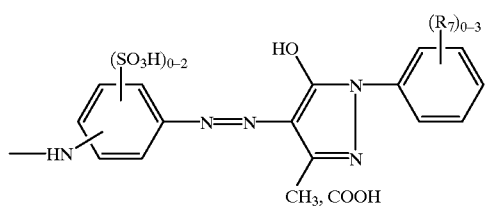
(10i)

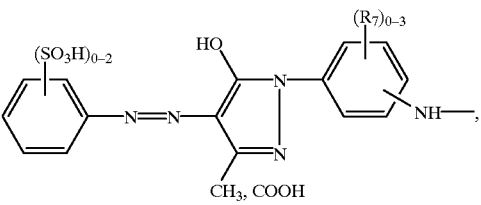
(10j)

in which $(R_7)_{0-3}$ is 0 to 3 identical or different substituents from the group consisting of $C_1$–$C_4$alkyl, $C_1$–$C_4$alkoxy, halogen, carboxyl and sulfo,

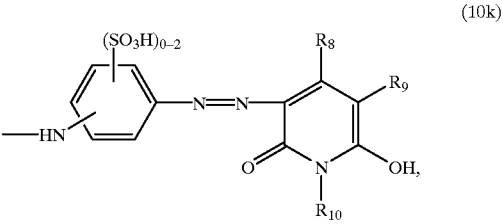
(10k)

in which $R_8$ and $R_{10}$ independently of one another are hydrogen, $C_1$–$C_4$alkyl or phenyl and $R_9$ is hydrogen, cyano, carbamoyl or sulfomethyl,

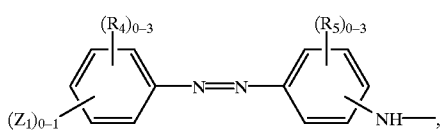
(10l)

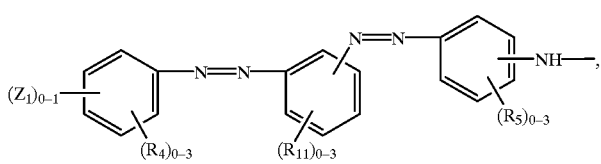
(10m)

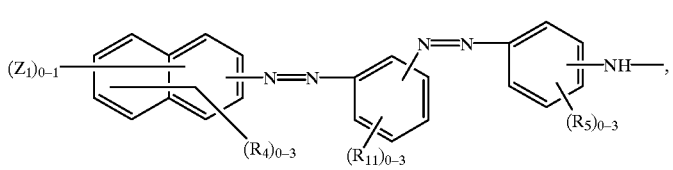
(10n)

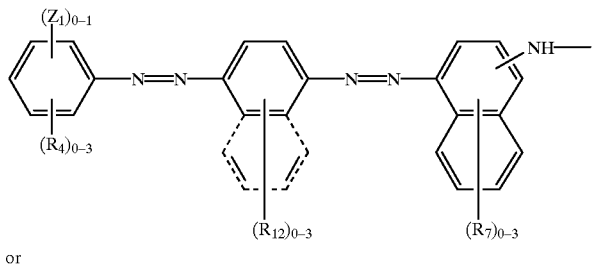

(10o)

or

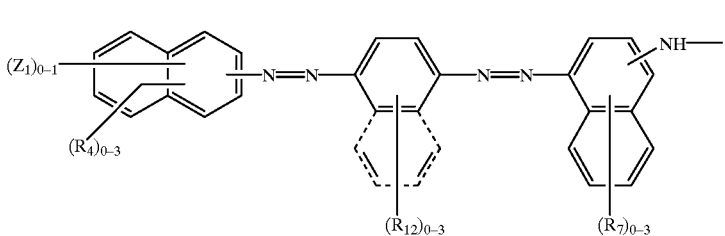

(10p)

in which (R$_4$)$_{0-3}$, (R$_5$)$_{0-3}$ and (R$_7$)$_{0-3}$ in each case are as defined above, (R$_{11}$)$_{0-3}$ and (R$_{12}$)$_{0-3}$ independently of one another are 0 to 3 identical or different substituents from the group consisting of C$_1$–C$_4$alkyl, C$_1$–C$_4$alkoxy, halogen, carboxyl and sulfo and Z$_1$ is as defined and preferred above.

The numbers on the naphthyl rings of the radicals of the formulae (10a), (10b), (10c), (10d), (10e), (10g) and (10h) identify the possible bonding positions.

(R$_4$)$_{0-3}$ in the disazoamino radicals of the formulae (10n) and (10p) is preferably 0 to 3 sulfo groups.

Particularly preferred monoazo- or disazoamino radicals T$_3$ are the radicals of the formula (10a), (10b), (10d), (10e), (10f), (10k) or (10m), in particular (10b), (10k) or (10m).

Preferably, a radical of the formula (6h) in which R$_{1a}$, X$_1$ and T$_3$ are as defined and preferred above is contained in only one of the radicals D$_1$, D$_2$ and D$_3$, in particular in D$_1$.

Radicals D$_1$, D$_2$ and D$_3$ of a substituted or unsubstituted diazo component of the benzene or naphthalene series independently of one another are, for example, phenyl or naphthyl, which is unsubstituted or substituted, for example by C$_1$–C$_4$alkyl, C$_1$–C$_4$alkoxy, halogen, sulfo, nitro, carboxyl or a fibre-reactive radical of the formulae (6a), (6b), (6c), (6d), (6e), (6f) or (6g), in particular (6a), (6c), (6d), (6e) or (6f), in which the fibre-reactive radicals mentioned are as defined and preferred above.

Radicals D$_1$, D$_2$ and D$_3$ of a substituted or unsubstituted diazo component of the benzene or naphthalene series independently of one another also include monoazo radicals, for example those of the formula (11) or (12)

or

preferably of the formula (12), in which D* is the radical of a diazo component of the benzene or naphthalene series, K* is the radical of a coupling component of the benzene, naphthalene, pyrazolone, 6-hydroxypyrid-2-one or acetoacetic acid arylamide series and K** is the radical of a coupling component of the benzene or naphthalene series, where D*, K* and K** can carry substituents customary in azo dyes.

Substituents which are not fibre-reactive D*, K* and K** are preferably C$_1$–C$_4$alkyl or C$_1$–C$_4$alkoxy which are unsubstituted or further substituted by hydroxyl, C$_1$–C$_4$alkoxy, sulfo or sulfato, halogen, carboxyl, sulfo, nitro, cyano, trifluoromethyl, sulfamoyl, carbamoyl, amino, ureido, hydroxyl, sulfomethyl, C$_2$–C$_4$alkanoylamino, C$_1$–C$_4$alkylsulfonylamino, benzoylamino which is unsubstituted or substituted in the phenyl ring by C$_1$–C$_4$alkyl, C$_1$–C$_4$alkoxy, halogen or sulfo or phenyl which is unsubstituted or substituted by C$_1$–C$_4$alkyl, C$_1$–C$_4$alkoxy, halogen, carboxyl or sulfo.

Fibre-reactive substituents for D*, K* and K** are preferably the radicals of the formulae (6a), (6c), (6d), (6e) or (6f), in particular (6a), in which the radicals mentioned are as defined and preferred above.

The monoazo radicals of the formula (11) or (12) preferably contain at least one sulfo group.

Preferred monoazo radicals D$_1$, D$_2$ and D$_3$ of the formula (12) are the radicals of the formula (12a), (12b), (12c), (12d), (12e), (12f), (12g), (12h), (12i) or (12j)

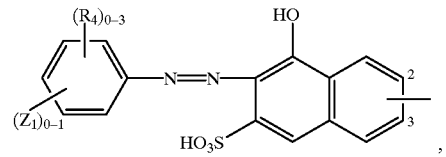

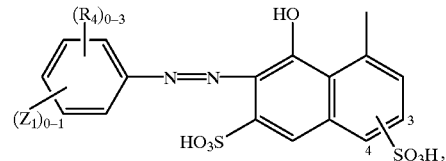

-continued

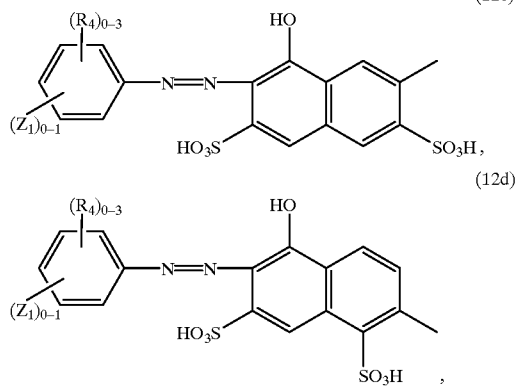

(12c)

(12d)

in which $(R_4)_{0-3}$ is 0 to 3 identical or different substituents from the group consisting of $C_1$–$C_4$alkyl, $C_1$–$C_4$alkoxy, halogen, carboxyl and sulfo and $Z_1$ is a fibre-reactive radical of the formula (6a), (6c), (6d), (6e), (6f) or (6g), preferably (6a), (6c), (6d) or (6e), and in particular (6a), in which the fibre-reactive radicals mentioned are as defined and preferred above,

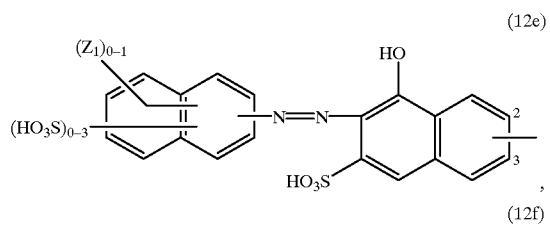

(12e)

(12f)

(12g)

-continued

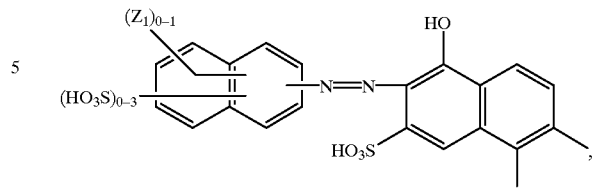

(12h)

(12i)

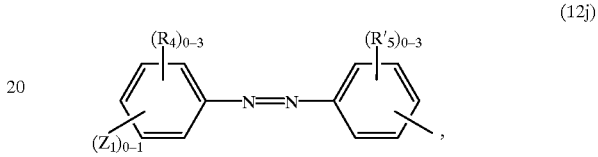

(12j)

in which $(R_4)_{0-3}$ is as defined above, $(R'_5)_{0-3}$ is 0 to 3 identical or different substituents from the group consisting of halogen, nitro, cyano, trifluoromethyl, sulfamoyl, carbamoyl, $C_1$–$C_4$alkyl, $C_1$–$C_4$alkoxy which is unsubstituted or substituted by hydroxyl, sulfato or $C_1$–$C_4$alkoxy, amino, $C_2$–$C_4$alkanoylamino, ureido, hydroxyl, carboxyl, sulfomethyl, $C_1$–$C_4$alkylsulfonylamino, sulfo and a fibre-reactive radical of the formula (6f), in which the radicals $R_{1a}$, $T_1$ and $X_1$ are as defined and preferred above, and $Z_1$ is as defined and preferred above.

The numbers on the naphthyl rings of the radicals of the formulae (12a), (12b), (12e) and (12f) identify the possible bonding positions.

The radicals $D_1$, $D_2$ and $D_3$ in the dyes of the formulae (2) or (3) according to the invention and the radicals $D_1$ and $D_2$ in the dyes of the formula (4) according to the invention are identical or are not identical.

An aromatic tetrazo component $D_4$ is, for example, phenylene or naphthylene which are unsubstituted or substituted by $C_1$–$C_4$alkyl, $C_1$–$C_4$alkoxy, $C_2$–$C_4$alkanoylamino, sulfo, halogen or carboxyl, or a radical of the formula (5), where the radical of the formula (5) is as defined above.

An aromatic tetrazo component $D_4$ is also a radical of the formula (5')

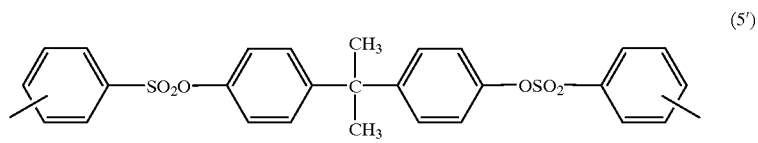

(5')

Preferably, $D_4$ is a naphthylene which is substituted by 1 to 3, preferably 2, sulfo groups, a radical of the formula (5') or a radical of the formula (5), in which the benzene rings I and II are unsubstituted or substituted by 1 or 2 sulfo groups and L is a direct bond, a $C_2$–$C_4$alkylene radical or a bridge member of the formula —CH=CH—, —NH—, —CO—, —NH—CO—, —NH—SO$_2$—, —NH—CO—NH—, —O—, —S— or —SO$_2$—.

An aliphatic radical R is, for example, the radicals defined above for $C_1$–$C_{12}$alkyl R' which is substituted or unsubstituted or interrupted by oxygen. Further examples of R are the following radicals: 2,5-di-(β-chloroethylsulfonyl)pentyl, 2-[2-(β-chloroethylsulfonyl)ethoxy]ethyl or 2-[2-(β-sulfatoethylsulfonyl)ethoxy]ethyl.

Aliphatic radicals R are furthermore, for example, $C_5$–$C_7$cycloalkyl radicals, such as, in particular, cyclohexyl radicals. The cycloalkyl radicals mentioned can be unsubstituted or substituted by $C_1$–$C_4$alkyl, $C_1$–$C_4$alkoxy, $C_2$–$C_4$alkanoylamino, sulfo, halogen or carboxyl, in particular by $C_1$–$C_4$alkyl. Aliphatic radicals R are furthermore methylene-cyclohexyl or ethylene-cyclohexyl radicals which are unsubstituted or substituted in the cyclohexyl ring by $C_1$–$C_4$alkyl, in particular methyl.

An aromatic radical R is, for example, phenyl or naphthyl which are unsubstituted or substituted, which include both the unsubstituted radicals and the radicals substituted by $C_1$–$C_4$alkyl, for example methyl or ethyl; $C_1$–$C_4$alkoxy, for example methoxy or ethoxy; $C_2$–$C_4$alkanoylamino; carboxyl; carbamoyl; sulfo or halogen, for example chlorine or bromine; or a fibre-reactive radical of the formula (6a), (6b), (6c), (6d), (6e), (6f) or (6g), where the fibre-reactive radicals of the formulae (6a), (6b), (6c), (6d), (6e), (6f) and (6g) are as defined and preferred above. Examples are the following radicals: o-, m- or p-chlorophenyl, o-, m- or p-methylphenyl, o-, m- or p-methoxyphenyl, o-, m- or p-sulfophenyl, disulfophenyl, o-, m- or p-carboxyphenyl, 1- or 2-naphthyl, 1-sulfo-2-naphthyl, 1,5-disulfo-2-naphthyl, 4,8-disulfo-2-naphthyl or 4-(β-sulfatoethylsulfonyl)phenyl.

Substituted or unsubstituted phenyl or naphthyl R furthermore is, for example, a monoazo or disazo radical of the formula (13) or (14)

$$D-N=N-(M-N=N)_u-K- \quad (13)$$

or $$-D-N=N-(M-N=N)_u-K \quad (14),$$

in which D, M, K and u are as defined above under the formulae (8) and (9).

Monoazo radicals R are, for example, the radicals of the formula (10a), (10b), (10c), (10d), (10e), (10f), (10g), (10h), (10i), (10j), (10k), (10l), (10m), (10n), (10o) or (10p) defined above, if the group —NH— in the particular formula is replaced by a direct bond.

A heterocyclic radical formed by the radicals R and R', together with the nitrogen atom, is, for example, morpholine.

In a preferred embodiment of the azo dyes of the formula (2), (3) or (4) according to the invention, A is oxygen or a radical —NR'—.

If A in the dyes of the formula (2) or (4) according to the invention is a radical —NR'—, R' is preferably hydrogen and R is preferably hydrogen, a $C_1$–$C_4$alkyl which is unsubstituted or substituted by hydroxyl, sulfo, carboxyl or sulfato, in particular hydroxyl or sulfato, and especially hydroxyl, or 2-(β-sulfatoethylsulfonyl)ethyl.

If A in the dyes of the formula (2) or (4) according to the invention is oxygen, R is preferably hydrogen or $C_1$–$C_4$alkyl which is unsubstituted or substituted by hydroxyl, and in particular hydrogen.

In the dyes of the formula (3) according to the invention, A is preferably a radical —NR'—, in which R' is hydrogen, methyl or ethyl, and especially hydrogen.

In a particularly preferred embodiment of the azo dyes of the formula (2) or (4) according to the invention, A is oxygen and R is hydrogen.

The azo dyes of the formula (2) or (4) according to the invention, and in particular of the formula (2), are preferred.

The radicals $D_1$, $D_2$ and $D_3$ independently of one another are preferably each a radical of the formula (15) or (16)

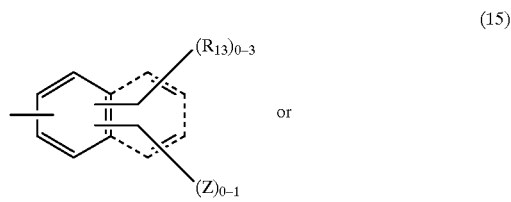

(15)

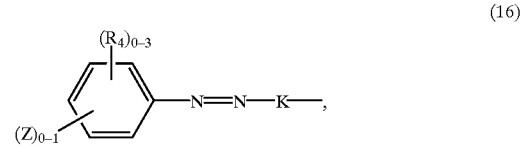

(16)

in which

K is the radical of a coupling component of the formula (17a) or (17b)

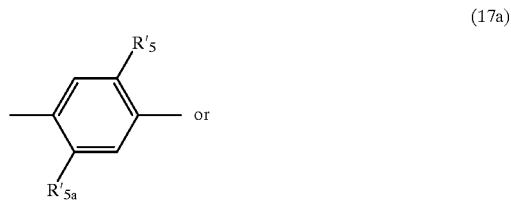

(17a)

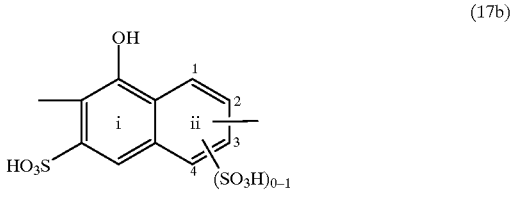

(17b)

and

Z and $Z_1$ independently of one another are a radical of the formula (6a), (6c), (6d), (6e) or (6f), in which $R_{1a}$ and $R_2$ are hydrogen, Hal is bromine, Y is vinyl, β-chloroethyl or β-sulfatoethyl, $T_1$ is $C_1$–$C_4$alkoxy, $C_1$–$C_4$alkylthio, hydroxyl, amino, N-mono- or N,N-di-$C_1$–$C_4$alkylamino which are unsubstituted or substituted in the alkyl moiety by hydroxyl, sulfato or sulfo, morpholino, phenylamino or N—$C_1$–$C_4$alkyl-N-phenylamino which are unsubstituted or substituted in the phenyl ring by sulfo, carboxyl, acetylamino, chlorine, methyl or methoxy and in which the alkyl is unsubstituted or substituted by hydroxyl, sulfo or sulfato, naphthylamino which is unsubstituted or substituted by 1 to 3 sulfo groups, or a fibre-reactive radical of the formula (7c') or (7d')

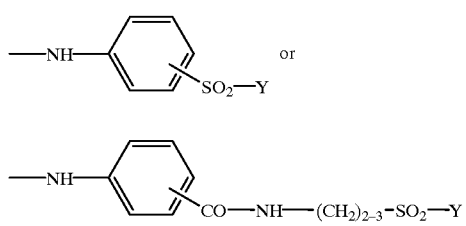

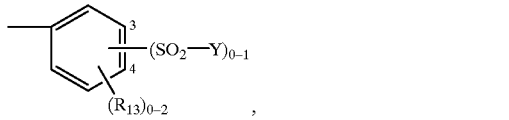

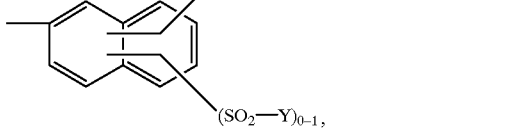

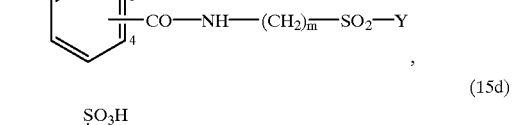

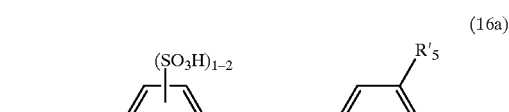

and

Y is as defined above, $X_1$ is chlorine or fluorine, m is the number 2 or 3, $(R_4)_{0-3}$ and $(R_{13})_{0-3}$ independently of one another are 0 to 3 identical or different substituents chosen from the group consisting of halogen, $C_1$–$C_4$alkyl, $C_1$–$C_4$alkoxy, carboxyl and sulfo, $R'_5$ is hydrogen, sulfo or $C_1$–$C_4$alkoxy which is unsubstituted or substituted in the alkyl moiety by hydroxyl or sulfato and $R'_{5a}$ is hydrogen, $C_1$–$C_4$alkyl, $C_1$–$C_4$alkoxy, $C_2$–$C_4$alkanoylamino, ureido or a radical of the formula (6f), in which radicals $R_{1a}$, $T_1$ and $X_1$ are as defined above.

$C_1$–$C_4$Alkyl $R_4$, $R'_{5a}$ and $R_{13}$ independently of one another are, for example, methyl, ethyl, n-propyl, isopropyl, n-butyl, sec-butyl, tert-butyl or isobutyl, preferably methyl or ethyl, and in particular methyl.

$C_1$–$C_4$-Alkoxy $R_4$, $R'_5$, $R'_{5a}$ and $R_{13}$ independently of one another are, for example, methoxy, ethoxy, n-propoxy, isopropoxy, n-butoxy or isobutoxy, preferably methoxy or ethoxy, and in particular methoxy. $R'_5$ is unsubstituted or may be substituted in the alkyl moiety by hydroxyl or sulfato.

Halogen $R_4$ and $R_{13}$ independently of one another are, for example, fluorine, chlorine or bromine, preferably chlorine or bromine, and in particular chlorine.

$C_2$–$C_4$-Alkanoylamino $R'_{5a}$ is, for example, acetylamino or propionylamino, in particular acetylamino.

A radical $R'_{5a}$ of the formula (6f) is preferably a radical in which $R_{1a}$ is hydrogen, $T_1$ is amino, N-mono- or N,N-di-$C_1$–$C_4$alkylamino which are unsubstituted or substituted in the alkyl moiety by hydroxyl, sulfato or sulfo, morpholino, phenylamino or N—$C_1$–$C_4$alkyl-N-phenylamino which are unsubstituted or substituted in the phenyl ring by sulfo, carboxyl, acetylamino, chlorine, methyl or methoxy and in which the alkyl is unsubstituted or substituted by hydroxyl, sulfo or sulfato or naphthylamino which is unsubstituted or substituted by 1 to 3 sulfo groups and $X_1$ is fluorine or chlorine.

In the radical of the coupling component of the formula (17b), the sulfo group in the ring ii is preferably bonded in the 3- or 4-position. If the ring ii contains a sulfo group, the radical of the formula (17b) is preferably bonded to the ring ii in the 1-, 2- or 3-position. If no sulfo group is present in the ring ii, the radical of the formula (17b) is preferably bonded to the ring ii in the 2- or 3-position.

The radicals $D_1$, $D_2$ and $D_3$ independently of one another are particularly preferably each a radical of the formula (15a), (15b), (15c), (15d) or (16a)

in which $R'_5$ is hydrogen, sulfo or ethoxy which is unsubstituted or substituted in the alkyl moiety by hydroxyl or sulfato, $R'_{5a}$ is hydrogen, methyl, ethyl, methoxy, ethoxy, acetylamino, propionylamino or ureido, $(R_{13})_{0-2}$ is 0 to 2 identical or different substituents chosen from the group consisting of halogen, $C_1$–$C_4$alkyl, $C_1$–$C_4$alkoxy and sulfo, in particular methyl, methoxy and sulfo, $Y_1$ is a group —CH(Br)—$CH_2$—Br or —C(Br)=$CH_2$, Y is vinyl, β-chloroethyl or β-sulfatoethyl, in particular vinyl or β-sulfatoethyl, and m is the number 2 or 3, in particular 2.

The numbers in the radicals of the formulae (15a), (15c) and (15d) identify the possible bonding positions of the fibre-reactive radical.

$D_1$, $D_2$ and $D_3$ independently of one another are in each case preferably a radical of the formula (15a), (15b) or (16a).

In the particular embodiment of the present invention defined above, in which a radical contained in $D_1$, $D_2$ and $D_3$ has the formula (6h), $D_1$ is preferably a radical of the formula (18)

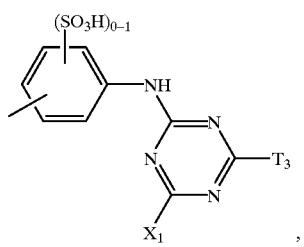
(18)

in which
X$_1$ is chlorine or fluorine, in particular chlorine, and
T$_3$ is a monoazo- or disazoamino radical of the formula (10a), (10b), (10d), (10e), (10f), (10k) or (10m), in which the radicals (R$_4$)$_{0-3}$, (R$_5$)$_{0-3}$, R$_8$, R$_{10}$, R$_9$ and (R$_{11}$)$_{0-3}$ are as defined above, and
Z$_1$ is a radical of the formula (6a), (6c'), (6d') or (6e')

   —SO$_2$—Y   (6a),

   —CONH—(CH$_2$)$_{2-3}$—SO$_2$—Y   (6c'),

   —NH—CO—CH(Br)—CH$_2$—Br   (6d')

or

   —NH—CO—C(Br)=CH$_2$   (6e'), preferably (6a), in which Y is vinyl, β-chloroethyl or β-sulfatoethyl, in particular vinyl or β-sulfatoethyl; and the radicals
D$_2$ and D$_3$ independently of one another are each a radical of the formula (15a), (15b), (15c) or (15d), in which the radicals (R$_{13}$)$_{0-2}$, Y, Y$_1$ and m are as defined above.
Preferred dyes are those of the formula (2a)

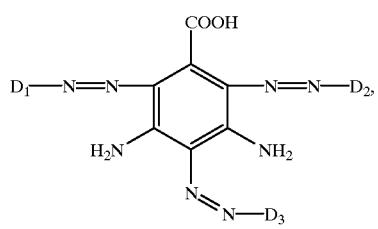
(2a)

in which
D$_1$, D$_2$ and D$_3$ independently of one another in each case are a radical of the formula (15a), (15b), (15c), (15d) or (16a), preferably (15a), (15b) or (16a), where at least one of the radicals D$_1$, D$_2$ and D$_3$ contains a fibre-reactive group; or
D$_1$ is a radical of the formula (18), in which
X$_1$ is chlorine and T$_3$ is a radical of the formula (10a), (10b), (10d), (10e), (10f), (10k) or (10m), preferably (10b), (10k) or (10m), and
D$_2$ and D$_3$ independently of one another in each case are a radical of the formula (15a), (15b), (15c) or (15d), preferably (15a) or (15b), where at least one of the radicals D$_2$ and D$_3$ contains a fibre-reactive group.
Preferably, at least two of the radicals D$_1$, D$_2$ and D$_3$ in the dye of the formula (2a) contain a fibre-reactive group.
The present invention furthermore relates to a process for the preparation of the azo dyes according to the invention, which comprises coupling one or more than one diazotized amine together or in any desired sequence to a compound containing at least one structural unit of the formula (19)

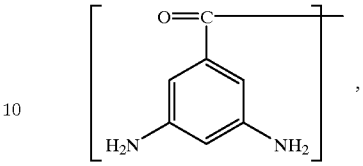
(19)

such that an azo dye which contains at least one structural unit of the formula (1) is obtained.

More than one diazotized amine means, for example, 2 or 3 diazotized amines.

Amines which are suitable for the preparation of the azo dyes according to the invention are, for example, aromatic amines of the benzene or naphthalene series which can be diazotized and are capable of coupling in accordance with processes known per se, such as are described, for example, in Venkataraman "The Chemistry of Synthetic Dyes" Volume 1, pages 210–214 and 409–441, Academic Press, New York, London 1952.

The amines are diazotized, for example, with a nitrite, for example with an alkali metal nitrite, such as sodium nitrite, in a mineral acid medium, for example in a hydrochloric acid medium, at temperatures of, for example, −5 to 40° C., and preferably at −5 to 10° C.

Coupling to the coupling components of the formula (19) is carried out in a manner known per se at an acid or neutral to weakly alkaline pH, for example a pH of 1 to 10, and at temperatures of, for example, −5 to 40° C., preferably 0 to 30° C.

The coupling reaction is advantageously first carried out in a strongly acid medium, for example at pH 1, and the pH of the reaction mixture is increased slowly, for example to pH 5 to 8, as the reaction progresses.

Azo dyes of the formula (2) in which A is oxygen and R is hydrogen and D$_1$=D$_2$≠D$_3$ or D$_2$=D$_3$≠D$_1$ are obtained, for example, by first reacting about 1 molar equivalent of a diazotized amine of the formula (20a)

   D$_1$—NH$_2$   (20a)

in an acid medium with about 1 molar equivalent of a compound of the formula (19a)

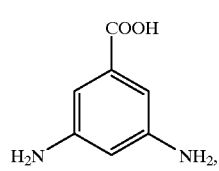
(19a)

to give a compound of the formula (21a)

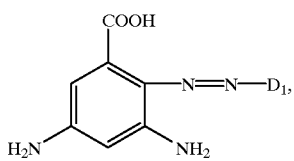
(21a)

and allowing the compound of the formula (21a) to react at an increased pH with about 2 molar equivalents of a diazotized amine of the formula (20b)

 (20b)

in which $D_1$ and $D_2$ are as defined and preferred above.

Azo dyes of the formula (2) in which A is oxygen, sulfur or a radical —NR'— and R is an aliphatic or aromatic radical and $D_1=D_2 \ne D_3$ or $D_2=D_3 \ne D_1$ are obtained, for example, by reacting about 1 molar equivalent of a compound of the formula (22a)

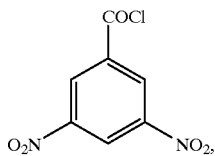
(22a)

with about 1 molar equivalent of a compound of the formula (23)

R—AH (23)

in a manner known per se to give a compound of the formula (22b)

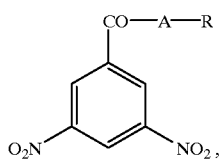
(22b)

reducing the compound of the formula (22b) to a compound of the formula (19c)

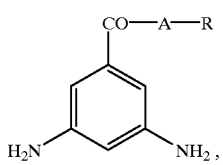
(19c)

in a manner known per se and then further reacting the compound of the formula (19c) stepwise with the diazotized amines of the formulae (20a) and (20b) analogously to the procedure described above, where R' and R are as defined and preferred above.

Azo dyes of the formula (3) in which $D_1=D_2 \ne D_3$ or $D_2=D_3 \ne D_1$ are obtained, for example, by reacting about 2 molar equivalents of a compound of the formula (22a) with about 1 molar equivalent of a compound of the formula (24)

HA—B—AH (24)

in a manner known per se to give a compound of the formula (22c)

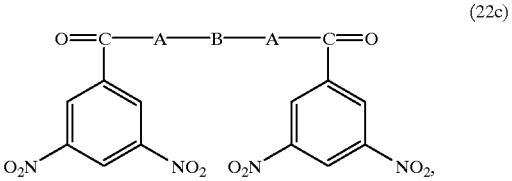
(22c)

reducing the compound of the formula (22c) to a compound of the formula (19d)

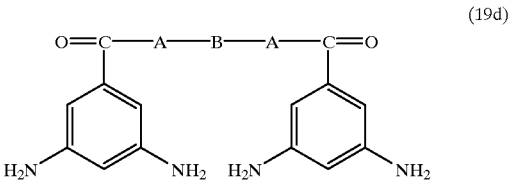
(19d)

in a manner known per se and then further reacting the compound of the formula (19d) stepwise with the equivalent amount of the diazotized amines of the formulae (20a) and (20b) analogously to the procedure described above, where A and B are as defined and preferred above.

The conditions for the reduction of the compounds of the formulae (22b) and (22c) are advantageously chosen such that any functional groups present in R, R' or B are not reduced. Such selective reduction reactions are known and are widely described in the relevant literature.

Those dyes of the formulae (2) and (3) according to the invention in which $D_1 \ne D_2 \ne D_3$ can be obtained if the procedure described above is followed, except the equimolar amount of a mixture of, for example, two diazotized amines $D_2$—$NH_2$ and $D_3$—$NH_2$ in a molar ratio of, for example, 1:1 is used in place of a diazotized amine $D_2$—$NH_2$. As a rule, these dyes are obtained as mixtures.

Azo dyes of the formula (4) in which A is oxygen and R is hydrogen and $D_1=D_2$ are obtained, for example, by first reacting about 1 molar equivalent of a tetrazotized diamine of the formula (20c)

$H_2N$—$D_4$—$NH_2$ (20c)

in a hydrochloric acid medium with about 2 molar equivalents of a compound of the formula (19a) to give a compound of the formula (21b)

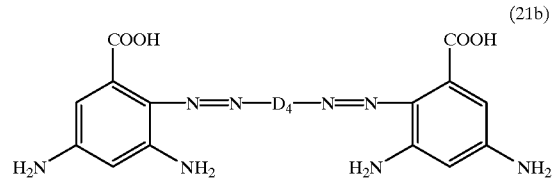
(21b)

and allowing the compound of the formula (21b) to react at an increased pH with about 4 molar equivalents of a diazotized amine of the formula $D_1$—$NH_2$, where $D_1$ and $D_4$ are as defined and preferred above.

Azo dyes of the formula (4) in which A is oxygen, sulfur or a radical —NR'— and R is an aliphatic or aromatic radical and $D_1=D_2$ are obtained, for example, if the procedure described above is followed, except that the equimolar amount of a compound of the formula (19c) is used in place of the compound of the formula (19a).

Those dyes of the formulae (4) according to the invention in which $D_1 \neq D_2$ can be obtained if the procedure described above is followed, except that an equimolar amount of a mixture of, for example, two diazotized amines $D_1$—$NH_2$ and $D_2$—$NH_2$ in a molar ratio of, for example, 1:1 is used in place of a diazotized amine $D_1$—$NH_2$. As a rule, the dyes are obtained as mixtures.

The compounds of the formulae (19a), (20a), (20b), (20c), (22a), (23) and (24) are known or can be obtained in a manner known per se.

Valuable direct dyes can be obtained from the dyes according to the invention which contain exclusively one or more halogenotriazinyl radicals of the formula (6f) as the fibre-reactive radical and in which $X_1$ is chlorine or fluorine and $T_1$ is a radical which is not fibre-reactive, by further reacting the dye with an amount equivalent to the amount of halogenotriazinyl of, for example, a compound of the formula $T_1$—H, in which $T_1$ is as defined above, excluding a fibre-reactive radical. In particular, $T_1$—H is ammonia, an amine which is unsubstituted or substituted as defined above or morpholine. Such reactions can be carried out by processes known per se.

The dyes according to the invention are suitable for dyeing and printing the most diverse materials, in particular fibre materials containing hydroxyl groups or containing nitrogen. Examples are paper, silk, leather, wool, polyamide fibres and polyurethanes, and in particular all types of cellulosic fibre materials. Such fibre materials are, for example, the natural cellulose fibres, such as cotton, linen and hemp, as well as pulp and regenerated cellulose. The dyes according to the invention are also suitable for dyeing or printing fibres containing hydroxyl groups which are contained in blend fabrics, for example mixtures of cotton with polyester fibres or polyamide fibres.

The present invention therefore furthermore relates to the use of compounds of the formula (1) for dyeing or printing fibre materials containing hydroxyl groups or containing nitrogen, in particular containing cotton.

The dyes according to the invention can be applied to the fibre material and fixed to the fibre in various ways, in particular in the form of aqueous dye solutions and printing pastes. They are suitable both for the exhaust method and for dyeing by the padder method, can be employed at low dyeing temperatures and require only short steaming times in the pad-steam process. The degrees of fixing are high and the unfixed portions can easily be washed off, the difference between the degree of exhaustion and degree of fixing being remarkably small, i.e. the soaping loss is very low. The dyes according to the invention are also suitable for printing, in particular on cotton, but likewise also for printing fibres containing nitrogen, for example wool, silk or blend fabrics containing wool.

The dyeings and prints produced with the dyes according to the invention, in particular the reactive dyes, have a high colour strength and a high fibre-dye bond stability both in the acid and in the alkaline range, and furthermore a good fastness to light and very good wet-fastness properties, such as fastness to washing, water, sea water, crossdyeing and perspiration. Dyeings which are level over the fibre and surface are obtained.

The following examples serve to illustrate the invention. Temperatures are stated in degrees Celsius, parts are parts by weight and percentage data relate to % by weight, unless noted otherwise. Parts by weight bear the same relation to parts by volume as the kilogram to the liter.

EXAMPLE 1

17.3 parts of an amine of the formula $D_{10}$—$NH_2$, in which $D_{10}$ is a radical of the formula

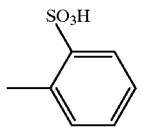

are introduced into 215 parts of water and the mixture is stirred thoroughly. 25 parts of a 4N sodium nitrite solution are added to the resulting solution at 0° C. and 20 parts of concentrated hydrochloric acid are then slowly added dropwise at 0 to 5° C. The mixture is stirred at this temperature for 1 hour.

EXAMPLE 2

56.2 parts of an amine of the formula $D_{11}$—$NH_2$, in which $D_{11}$ is a radical of the formula

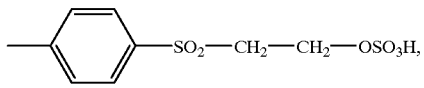

are introduced into 220 parts of water and the mixture is stirred thoroughly. First 50 parts of a 4N sodium nitrite solution and then 90 parts of a 31% naphthalenesulfonic acid solution are added to the resulting suspension at 10° C. The mixture is then stirred at 15 to 20° C. for 3 hours.

EXAMPLES 3 to 33

The diazo compounds of the amines listed in Table 1 can be prepared analogously to the procedure described in Examples 1 or 2 if an equimolar amount of the amines of the formula $D_{xy}$—$NH_2$ listed in Table 1 is used in place of the amines of the formula $D_{10}$—$NH_2$ or $D_{11}$—$NH_2$ mentioned in Examples 1 or 2.

TABLE 1
| Exp. | Amine $D_{xy}$-$NH_2$ | $D_{xy}$ | |
|---|---|---|---|
| 3 | $D_{12}$-$NH_2$ | $D_{12}$ = | 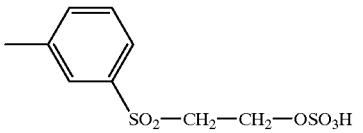 |
| 4 | $D_{13}$-$NH_2$ | $D_{13}$ = | 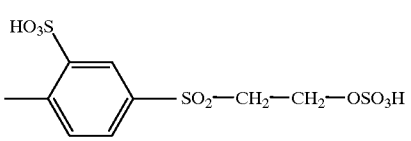 |
| 5 | $D_{14}$-$NH_2$ | $D_{14}$ = | 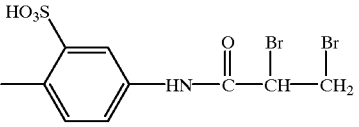 |
| 6 | $D_{15}$-$NH_2$ | $D_{15}$ = | 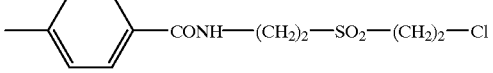 |
| 7 | $D_{16}$-$NH_2$ | $D_{16}$ = | 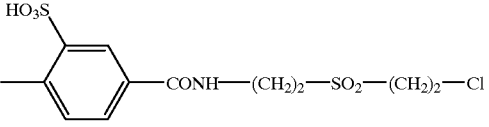 |
| 8 | $D_{17}$-$NH_2$ | $D_{17}$ = | 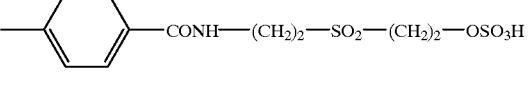 |
| 9 | $D_{18}$-$NH_2$ | $D_{18}$ = | 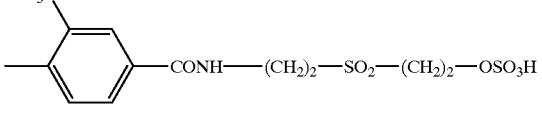 |
| 10 | $D_{19}$-$NH_2$ | $D_{19}$ = | 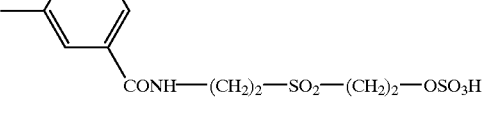 |
| 11 | $D_{20}$-$NH_2$ | $D_{20}$ = | 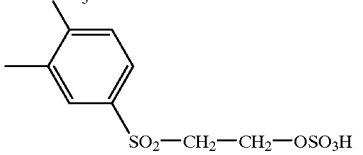 |
| 12 | $D_{21}$-$NH_2$ | $D_{21}$ = | 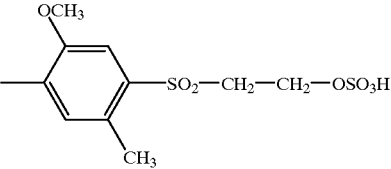 |

TABLE 1-continued

| Exp. | Amine $D_{xy}$-$NH_2$ | $D_{xy}$ | |
|---|---|---|---|
| 13 | $D_{22}$-$NH_2$ | $D_{22}$ = | 2,5-dimethoxy-4-methylphenyl-$SO_2$—$CH_2$—$CH_2$—$OSO_3H$ |
| 14 | $D_{23}$-$NH_2$ | $D_{23}$ = | 1-$SO_3H$-2-methyl-6-($SO_2$—$CH_2$—$CH_2$—$OSO_3H$)naphthyl |
| 15 | $D_{24}$-$NH_2$ | $D_{24}$ = | 1-$SO_3H$-2-methyl-5-($SO_2$—$CH_2$—$CH_2$—$OSO_3H$)naphthyl |
| 16 | $D_{25}$-$NH_2$ | $D_{25}$ = | 7-methyl-1-($SO_2$—$CH_2$—$CH_2$—$OSO_3H$)naphthyl |
| 17 | $D_{26}$-$NH_2$ | $D_{26}$ = | 6-methyl-3-$SO_3H$-4-($SO_2$—$CH_2$—$CH_2$—$OSO_3H$)naphthyl |
| 18 | $D_{27}$-$NH_2$ | $D_{27}$ = | 6-methyl-2-($SO_2$—$CH_2$—$CH_2$—$OSO_3H$)naphthyl |
| 19 | $D_{28}$-$NH_2$ | $D_{28}$ = | 5-methyl-2-($SO_2$—$CH_2$—$CH_2$—$OSO_3H$)naphthyl |
| 20 | $D_{29}$-$NH_2$ | $D_{29}$ = | 4-$HO_3S$-3-methyl-phenyl-NH-CO-CHBr-$CH_2$Br |

TABLE 1-continued

| Exp. | Amine $D_{xy}$-$NH_2$ | $D_{xy}$ |
|---|---|---|
| 21 | $D_{30}$-$NH_2$ | $D_{30}$ = 2-methylnaphthalene-1-sulfonic acid ($SO_3H$) |
| 22 | $D_{31}$-$NH_2$ | $D_{31}$ = 6-methylnaphthalene-1,5-disulfonic acid ($SO_3H$, $SO_3H$) |
| 23 | $D_{32}$-$NH_2$ | $D_{32}$ = $HO_3S$—(2-methylphenyl)—$NHCO$—$(CH_2)_3$—$SO_2$—$(CH_2)_2$—$Cl$ |
| 24 | $D_{33}$-$NH_2$ | $D_{33}$ = $HO_3S$—(3-methylphenyl)—$NHCO$—$(CH_2)_3$—$SO_2$—$(CH_2)_2$—$Cl$ |
| 25 | $D_{34a}$-$NH_2$-$D_{34r}$-$NH_2$ | $D_{34a}$–$D_{34r}$ = $HO_3S$—(methylphenyl)—$HN$—(triazine with $T_1$, $Cl$) |
| | | $T_1$: |
| 25a | $D_{34a}$-$NH_2$ | $D_{34a}$ = —$NH$—C$_6$H$_4$—$SO_3H$ |
| 25b | $D_{34b}$-$NH_2$ | $D_{34b}$ = —$NH$—(3-methylphenyl)—$CH_3$ |
| 25c | $D_{34c}$-$NH_2$ | $D_{34c}$ = —$NH$—(phenyl)—$NHCO$—$CH_3$ |

TABLE 1-continued

| Exp. | Amine $D_{xy}$-$NH_2$ | $D_{xy}$ | |
|---|---|---|---|
| 25d | $D_{34d}$-$NH_2$ | $D_{34d}$ | 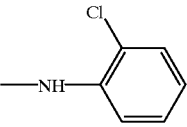 —NH—(2-Cl-phenyl) |
| 25e | $D_{34e}$-$NH_2$ | $D_{34e}$ | —NHCH$_2$CH$_2$OH |
| 25f | $D_{34f}$-$NH_2$ | $D_{34f}$ | —N(CH$_2$CH$_2$OH)$_2$ |
| 25g | $D_{34g}$-$NH_2$ | $D_{34g}$ | 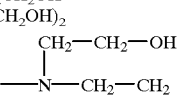 |
| 25h | $D_{34h}$-$NH_2$ | $D_{34h}$ | 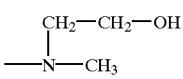 |
| 25i | $D_{34i}$-$NH_2$ | $D_{34i}$ | —NH—(CH$_2$)$_2$—O—(CH$_2$)$_2$—OH |
| 25j | $D_{23j}$-$NH_2$ | $D_{34j}$ | —NHCH$_2$CH$_2$SO$_3$H |
| 25k | $D_{34k}$-$NH_2$ | $D_{34k}$ | 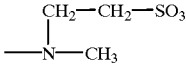 |
| 25l | $D_{34l}$-$NH_2$ | $D_{34l}$ | 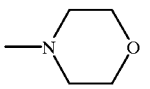 morpholino |
| 25m | $D_{34m}$-$NH_2$ | $D_{34m}$ | —NH—(CH$_2$)$_2$—SO$_2$—(CH$_2$)$_2$—Cl |
| 25n | $D_{34n}$-$NH_2$ | $D_{34n}$ | —NH—(CH$_2$)$_2$—O—(CH$_2$)$_2$—SO$_2$—(CH$_2$)$_2$—Cl |
| 25o | $D_{34o}$-$NH_2$ | $D_{34o}$ | 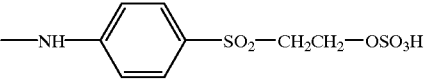 |
| 25p | $D_{34p}$-$NH_2$ | $D_{34p}$ | 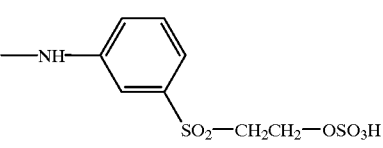 |
| 25q | $D_{34q}$-$NH_2$ | $D_{34q}$ | 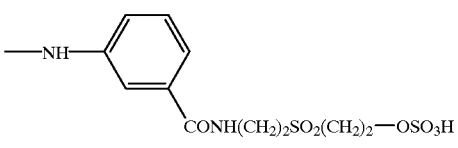 |
| 25r | $D_{34r}$-$NH_2$ | $D_{34r}$ | 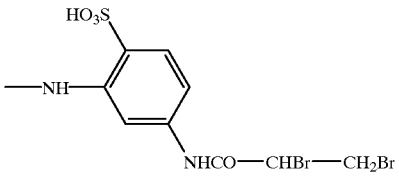 |
| 26 | $D_{35}$-$NH_2$ | $D_{35}$ = | 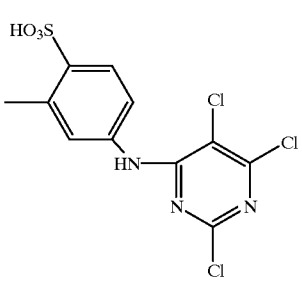 |

TABLE 1-continued

| Exp. | Amine $D_{xy}$-NH$_2$ | $D_{xy}$ | |
|---|---|---|---|
| 27 | $D_{36}$-NH$_2$ | $D_{36}$ = | 4-sulfo-3-methylphenyl-NH-(5-chloro-6-fluoro-2-fluoropyrimidin-4-yl) |
| 28 | $D_{37}$-NH$_2$ | $D_{37}$ = | 4-sulfo-3-methylphenyl-NH-(2,5,6-trichloropyrimidin-4-yl) |
| 29 | $D_{38}$-NH$_2$ | $D_{38}$ = | 2-methyl-5-sulfophenyl-N=N-(4-sulfophenyl) |
| 30 | $D_{39}$-NH$_2$ | $D_{39}$ = | 5-methoxy-4-methyl-2-methoxyphenyl-N=N-(2-sulfo-4-(SO$_2$—CH$_2$—CH$_2$—OSO$_3$H)phenyl) |
| 31 | $D_{40a}$-NH$_2$-$D_{40f}$-NH$_2$ | $D_{40a}$–$D_{40f}$ = | 4-sulfo-3-methylphenyl-NH-(6-T$_3$-2-chloro-1,3,5-triazin-4-yl); T$_3$: |
| 31a | $D_{40a}$-NH$_2$ | $D_{40a}$ | —NH-(phenyl with NHCONH$_2$)-N=N-(2-sulfophenyl)-N=N-(4-sulfophenyl) |

TABLE 1-continued

| Exp. | Amine $D_{xy}$-NH$_2$ | $D_{xy}$ | |
|---|---|---|---|
| 31b | $D_{40b}$-NH$_2$ | $D_{40b}$ | (structure: 4-methylamino-2-ureido-phenyl azo coupled to naphthalene-1,3,6-trisulfonic acid) |
| 31c | $D_{40c}$-NH$_2$ | $D_{40c}$ | (structure: 4-methylamino-2-acetamido-phenyl azo coupled to 8-hydroxy-naphthalene-1,3,6-trisulfonic acid derivative) |
| 31d | $D_{40d}$-NH$_2$ | $D_{40d}$ | (structure: 4-methylamino-2-acetamido-phenyl azo coupled to naphthalene-1,5-disulfonic acid) |
| 31e | $D_{40e}$-NH$_2$ | $D_{40a}$ | (structure: aminosulfophenyl azo pyridone with CH$_3$, CONH$_2$, OH, N-CH$_2$CH$_3$) |
| 31f | $D_{40f}$-NH$_2$ | $D_{40f}$ | (structure: aminosulfophenyl azo pyridone with CH$_3$, CH$_2$SO$_3$H, OH, N-CH$_2$CH$_3$) |
| 32 | $D_{41a}$-NH$_2$-$D_{41u}$-NH$_2$ | $D_{41a}$–$D_{41u}$ = | (structure: methyl-sulfophenyl-NH–chlorotriazine–NH–naphthol disulfonic acid azo-D) |

TABLE 1-continued

| Exp. | Amine $D_{xy}$-$NH_2$ | $D_{xy}$ | |
|---|---|---|---|
| 33 | $D_{42a}$-$NH_2$-$D_{42u}$-$NH_2$ | $D_{42a}$–$D_{42u}$ = | (structure: $HO_3S$-tolyl-NH-[chloro-triazine]-NH-naphthol($SO_3H$)-N=N-D) |
| | | D: | |
| 32a/33a | $D_{41a/42a}$-$NH_2$ | $D_{41a/42a}$ | 2-methylbenzenesulfonic acid ($HO_3S$, $CH_3$) |
| 32b/33b | $D_{41b/42b}$-$NH_2$ | $D_{41b/42b}$ | 2-methyl-1,4-benzenedisulfonic acid ($HO_3S$, $CH_3$, $SO_3H$) |
| 32c/33c | $D_{41c/42c}$-$NH_2$ | $D_{41c/42c}$ | 2-methyl-4-methoxybenzenesulfonic acid ($HO_3S$, $CH_3$, $OCH_3$) |
| 32d/33d | $D_{41d/42d}$-$NH_2$ | $D_{41d/42d}$ | ($HO_3S$, $CH_3$, $OCH_3$, $SO_3H$) |
| 32e/33e | $D_{41e/42e}$-$NH_2$ | $D_{41e/42e}$ | ($HO_3S$, $CH_3$, $CH_3$) |
| 32f/33f | $D_{41f/42f}$-$NH_2$ | $D_{41f/42f}$ | ($HO_3S$, $CH_3$, $CH_3$, $SO_3H$) |
| 32g/33g | $D_{41g/42g}$-$NH_2$ | $D_{41g/42g}$ | 2-methylnaphthalene-1-sulfonic acid ($SO_3H$, $CH_3$) |

TABLE 1-continued

| Exp. | Amine $D_{xy}$-$NH_2$ | $D_{xy}$ | |
|---|---|---|---|
| 32h/33h | $D_{41h/42h}$-$NH_2$ | $D_{41h/42h}$ | 3-methyl naphthalene with $SO_3H$ at position 1 and $SO_3H$ at position 5 |
| 32i/33i | $D_{41i/42i}$-$NH_2$ | $D_{41i/42i}$ | naphthalene with methyl, $SO_3H$, and $SO_2$—$CH_2CH_2$—$OSO_3H$ |
| 32j/33j | $D_{41j/42j}$-$NH_3$ | $D_{41j/42j}$ | naphthalene with methyl and $SO_2$—$CH_2CH_2$—$OSO_3H$ |
| 32k/33k | $D_{41k/42k}$-$NH_2$ | $D_{41k/42k}$ | naphthalene with methyl, $SO_3H$, and $SO_2$—$CH_2CH_2$—$OSO_3H$ |
| 32l/33l | $D_{41l/42l}$-$NH_2$ | $D_{41l/42l}$ | naphthalene with methyl and $SO_2$—$CH_2CH_2$—$OSO_3H$ |
| 32m/33m | $D_{41m/42m}$-$NH_2$ | $D_{41m/42m}$ | naphthalene with methyl, $SO_2$—$CH_2CH_2$—$OSO_3H$, and $SO_3H$ |
| 32n/33n | $D_{41n/42n}$-$NH_2$ | $D_{41n/42n}$ | benzene with methyl and $SO_2$—$CH_2CH_2$—$OSO_3H$ (para) |
| 32o/33o | $D_{41o/42o}$-$NH_2$ | $D_{41o/42o}$ | benzene with methyl and $SO_2$—$CH_2CH_2$—$OSO_3H$ (meta) |
| 32p/33p | $D_{41p/42p}$-$NH_2$ | $D_{41p/42p}$ | benzene with methyl, $HO_3S$, and $SO_2$—$CH_2CH_2$—$OSO_3H$ |

TABLE 1-continued

| Exp. | Amine $D_{xy}$-NH$_2$ | $D_{xy}$ | |
|---|---|---|---|
| 32q/33q | $D_{41q/42q}$-NH$_2$ | $D_{41q/42q}$ | H$_3$CO—⟨phenyl, CH$_3$⟩—SO$_2$—CH$_2$CH$_2$—OSO$_3$H |
| 32r/33r | $D_{41r/42r}$-NH$_2$ | $D_{41r/42r}$ | H$_3$CO—⟨phenyl, CH$_3$⟩—SO$_2$—CH$_2$CH$_2$—OSO$_3$H |
| 32s/33s | $D_{41s/42s}$-NH$_2$ | $D_{41s/42s}$ | ⟨phenyl⟩—CONH(CH$_2$)$_2$SO$_2$(CH$_2$)$_2$OSO$_3$H |
| 32t/33t | $D_{41t/42t}$-NH$_2$ | $D_{41t/42t}$ | HO$_3$S—⟨phenyl⟩—NHCO—CHBr—CH$_2$Br |
| 32u/33u | $D_{41u/42u}$-NH$_2$ | $D_{41u/42u}$ | HO$_3$S—⟨phenyl⟩—NHCO—CHBr—CH$_2$Br |

EXAMPLE 34

16 parts of the diamine of the formula H$_2$N—D$_{43}$—NH$_2$, in which D$_{43}$ is a radical of the formula

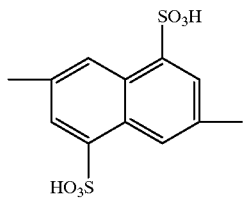

are dissolved in 160 parts of water under neutral conditions. 13 parts of concentrated hydrochloric acid and then 19.5 parts of a 4N sodium nitrite solution are slowly added at 0° C. When the diamine has reacted to give the corresponding tetrazo compound, the excess nitrite is destroyed by addition of sulfamic acid.

EXAMPLES 35 to 37

The tetrazo compounds of the diamines listed in Table 2 can be prepared analogously to the procedure described in Example 34 if an equimolar amount of the diamines of the formula H$_2$N—D$_{xy}$—NH$_2$ listed in Table 2 is used in place of the diamine of the formula H$_2$N—D$_{43}$—NH$_2$ mentioned in Example 34.

TABLE 2

| Exp. | Diamine $H_2N-D_{xy}-NH_2$ | $D_{xy}$ |
|---|---|---|
| 35 | $H_2N-D_{44}-NH_2$ | $D_{44}$ = ![structure] |
| 36 | $H_2N-D_{45}-NH_2$ | $D_{45}$ = ![structure] |
| 37 | $H_2N-D_{46}-NH_2$ | $D_{46}$ = ![structure] |

EXAMPLE 38 a) 1st coupling: a solution of 15.2 parts of 3,5-diaminobenzoic acid in 100 parts of 2N hydrochloric acid is added at 0 to 5° C. to the acid diazo compound suspension obtained according to Example 1. The pH of the reaction mixture is brought to 3.2 in the course of 4 hours with a 40% sodium acetate solution. The mixture is then stirred at 6 to 7° C. for a further 30 minutes. A compound which, in the form of the free acid, has the formula (101)

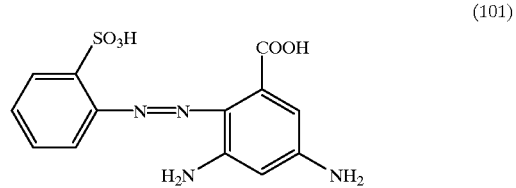

(101)

is obtained.

b) 2nd coupling: the acid diazo compound suspension obtained according to Example 2 is added at 7° C. and pH 3.2 to the suspension, obtained according to a), of the compound of the formula (101). The pH of the reaction mixture is brought to 3.5 in the course of 45 minutes at 12 to 15° C. with a 40% sodium acetate solution and to 6.3 in the course of 1 hour at 15 to 19° C. with sodium bicarbonate. The mixture is then stirred at about 25° C. for a further 45 minutes. The resulting solution is treated with 450 parts of acetone, the pH is brought to 1.5 with concentrated hydrochloric acid and 4.6 parts of potassium chloride are added. The dye which has precipitated out is filtered off and washed with acetone. 70.1 parts of a compound which, in the form of the free acid, has the formula (102)

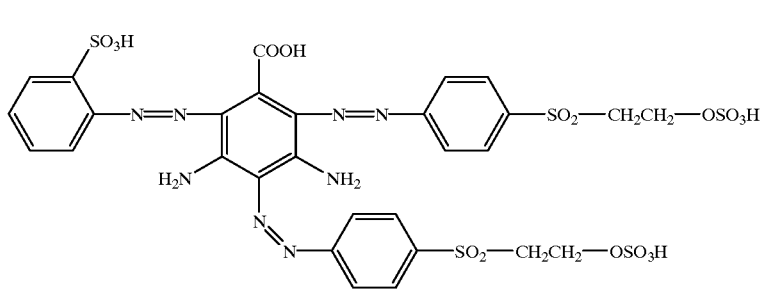

(102)

and dyes cotton and wool in orange colour shades with good allround properties are obtained.

EXAMPLES 39 to 108

The dyes of the following general formula (103)

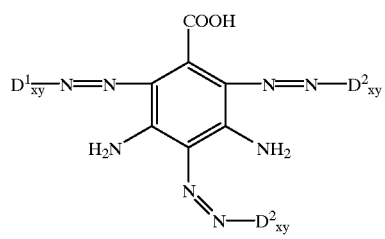

in which $D^1_{xy}$ and $D^2_{xy}$ in each case are the radicals listed in Table 3 and these radicals are as defined in Examples 1 and 2 and in Table 1 can be prepared from the diazo compounds described in Examples 1 to 33 analogously to the procedure described in Example 38. The dyes dye cotton and wool in the colour shades stated in Table 3 with good allround properties.

TABLE 3

| Exp. | $D^1_{xy}$ 1st coupling | $D^2_{xy}$ 2nd coupling | Colour shade |
|---|---|---|---|
| 39 | $D_{10}$ | $D_{12}$ | orange |
| 40 | $D_{13}$ | $D_{11}$ | orange |
| 41 | $D_{13}$ | $D_{12}$ | orange |
| 42 | $D_{10}$ | $D_{13}$ | orange |
| 43 | $D_{10}$ | $D_{14}$ | orange |
| 44 | $D_{10}$ | $D_{15}$ | orange |
| 45 | $D_{10}$ | $D_{16}$ | orange |
| 46 | $D_{10}$ | $D_{17}$ | orange |
| 47 | $D_{10}$ | $D_{18}$ | orange |
| 48 | $D_{10}$ | $D_{32}$ | orange |
| 49 | $D_{10}$ | $D_{33}$ | orange |
| 50 | $D_{10}$ | $D_{19}$ | orange |
| 51 | $D_{10}$ | $D_{20}$ | orange |
| 52 | $D_{10}$ | $D_{21}$ | orange |
| 53 | $D_{10}$ | $D_{22}$ | orange |
| 54 | $D_{10}$ | $D_{29}$ | orange |
| 55 | $D_{30}$ | $D_{11}$ | orange |
| 56 | $D_{30}$ | $D_{12}$ | orange |
| 57 | $D_{30}$ | $D_{13}$ | orange |
| 58 | $D_{30}$ | $D_{14}$ | orange |
| 59 | $D_{30}$ | $D_{15}$ | orange |
| 60 | $D_{30}$ | $D_{16}$ | orange |
| 61 | $D_{30}$ | $D_{17}$ | orange |
| 62 | $D_{30}$ | $D_{18}$ | orange |
| 63 | $D_{30}$ | $D_{19}$ | orange |
| 64 | $D_{30}$ | $D_{20}$ | orange |
| 65 | $D_{30}$ | $D_{21}$ | orange |
| 66 | $D_{30}$ | $D_{22}$ | orange |
| 67 | $D_{30}$ | $D_{29}$ | orange |
| 68 | $D_{31}$ | $D_{11}$ | orange |
| 69 | $D_{38}$ | $D_{11}$ | brown |
| 70 | $D_{10}$ | $D_{23}$ | orange |
| 71 | $D_{10}$ | $D_{24}$ | orange |
| 72 | $D_{10}$ | $D_{25}$ | orange |
| 73 | $D_{10}$ | $D_{26}$ | orange |
| 74 | $D_{10}$ | $D_{27}$ | orange |
| 75 | $D_{10}$ | $D_{28}$ | orange |
| 76 | $D_{34a}$ | $D_{13}$ | brown-orange |
| 77 | $D_{34b}$ | $D_{13}$ | brown-orange |
| 78 | $D_{34c}$ | $D_{13}$ | brown-orange |
| 79 | $D_{34d}$ | $D_{13}$ | brown-orange |
| 80 | $D_{34e}$ | $D_{13}$ | brown-orange |
| 81 | $D_{34f}$ | $D_{13}$ | brown-orange |
| 82 | $D_{34g}$ | $D_{13}$ | brown-orange |
| 83 | $D_{34h}$ | $D_{13}$ | brown-orange |
| 84 | $D_{34i}$ | $D_{13}$ | brown-orange |
| 85 | $D_{34j}$ | $D_{13}$ | brown-orange |
| 86 | $D_{34k}$ | $D_{13}$ | brown-orange |
| 87 | $D_{34l}$ | $D_{13}$ | brown-orange |
| 88 | $D_{34m}$ | $D_{13}$ | brown-orange |
| 89 | $D_{34n}$ | $D_{13}$ | brown-orange |
| 90 | $D_{34o}$ | $D_{13}$ | brown-orange |
| 91 | $D_{34p}$ | $D_{13}$ | brown-orange |
| 92 | $D_{34q}$ | $D_{13}$ | brown-orange |
| 93 | $D_{34r}$ | $D_{13}$ | brown-orange |
| 94 | $D_{35}$ | $D_{13}$ | brown-orange |
| 95 | $D_{36}$ | $D_{13}$ | brown-orange |
| 96 | $D_{37}$ | $D_{13}$ | brown-orange |
| 97 | $D_{35}$ | $D_{11}$ | brown-orange |
| 98 | $D_{36}$ | $D_{11}$ | brown-orange |
| 99 | $D_{37}$ | $D_{11}$ | brown-orange |
| 100 | $D_{34a}$ | $D_{11}$ | brown-orange |
| 101 | $D_{34e}$ | $D_{11}$ | brown-orange |
| 102 | $D_{34f}$ | $D_{11}$ | brown-orange |
| 103 | $D_{34g}$ | $D_{11}$ | brown-orange |
| 104 | $D_{34h}$ | $D_{11}$ | brown-orange |
| 105 | $D_{39}$ | $D_{13}$ | brown |
| 106 | $D_{39}$ | $D_{11}$ | brown |
| 107 | $D_{40a}$ | $D_{13}$ | brown-orange |
| 108 | $D_{40a}$ | $D_{11}$ | brown-orange |

EXAMPLE 109 a) 1st coupling: a solution of 15.2 parts of 3,5-diaminobenzoic acid in 100 parts of 2N hydrochloric acid is added at 0 to 5° C. to the acid tetrazo compound suspension obtained according to Example 34. The pH of the reaction mixture is brought to 3.2 in the course of 4 hours with a 40% sodium acetate solution. The mixture is then stirred at 6 to 7° C. for a further 30 minutes. A compound which, in the form of the free acid, has the formula (104)

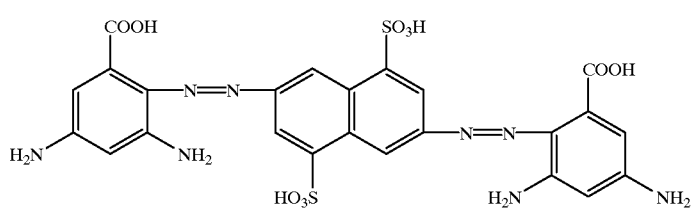

(104)

is obtained.

b) 2nd coupling: the acid diazo compound suspension obtained according to Example 2 is added at 7° C. and pH 3.2 to the suspension, obtained according to a), of the compound of the formula (104). The pH of the reaction mixture is brought to 3.5 in the course of 45 minutes at 12 to 15° C. with a 40% sodium acetate solution and to 6.3 in the course of one hour at 15 to 19° C. with sodium bicarbonate. The mixture is then stirred at about 25° C. for a further 45 minutes. 450 parts of acetone are added to the resulting solution, the pH is brought to 1.5 with concentrated hydrochloric acid and 4.6 parts of potassium chloride are added. The dye which has precipitated out is filtered off and washed with acetone. 68 parts of a compound which, in the form of the free acid, has the formula (105)

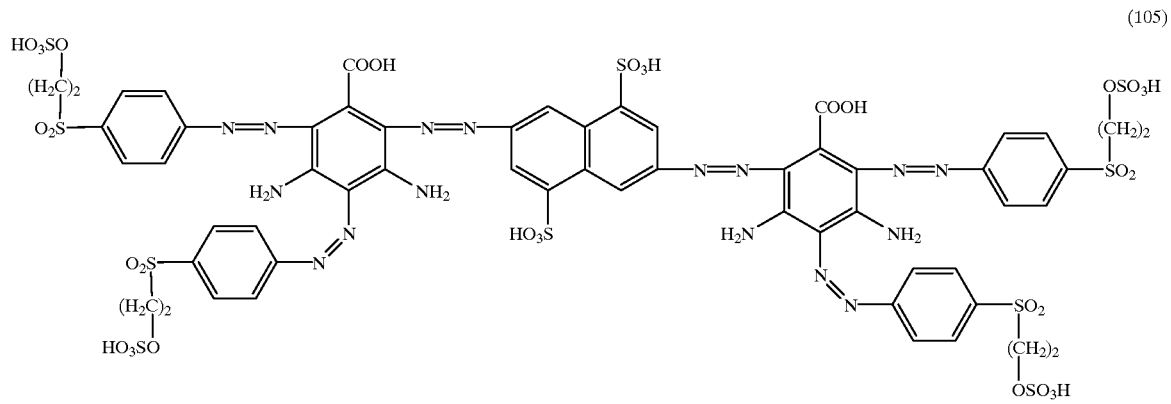

(105)

and dyes cotton and wool in brown-orange colour shades with good allround properties are obtained.

EXAMPLES 110 to 113

The dyes of the following general formula (106)

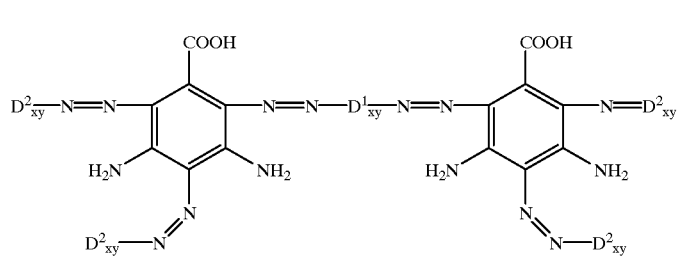

(106)

in which $D^1_{xy}$ and $D^2_{xy}$ in each case are the radicals listed in Table 4 and these radicals are as defined in Table 2 and in Examples 2 and 4, can be prepared from the tetrazo compounds described in Table 2 and the diazo compounds described in Examples 2 and 4 analogously to the procedure described in Example 109. The dyes dye cotton and wool in the colour shades stated in Table 4 with good allround properties.

TABLE 4

| Exp. | $D^1_{xy}$ 1st coupling | $D^2_{xy}$ 2nd coupling | Colour shade |
|---|---|---|---|
| 110 | $D_{44}$ | $D_{13}$ | brown-orange |
| 111 | $D_{45}$ | $D_{13}$ | brown-orange |
| 112 | $D_{46}$ | $D_{13}$ | brown-orange |
| 113 | $D_{46}$ | $D_{11}$ | brown-orange |

EXAMPLE 114

A solution of 10.1 parts of 3,5-diaminobenzoic acid in 67 parts of 2N hydrochloric acid is added at 0 to 5° C. to the acid diazo compound suspension obtained according to Example 2. The pH of the reaction mixture is brought to 3.2 in the course of one hour with a 40% sodium acetate solution, to 5.8 in the course of a further hour with sodium bicarbonate and to 7.8 in the course of 45 minutes with a 20% sodium carbonate solution. The resulting solution is brought to pH 0.8 with concentrated hydrochloric acid, and 80 parts of acetone and 112 parts of potassium chloride are added. The dye which has precipitated out is filtered off and washed with acetone. 64.6 parts of a compound which, in the form of the free acid, has the formula (107)

from the diazo compounds described in Examples 3 to 5, 9 to 12, 14, 15, 20 and 23 to 25 analogously to the procedure described in Example 114. The dyes dye cotton and wool in the colour shades stated in Table 5 with good allround properties.

TABLE 5

| Exp. | $D_{xy}$ | Colour shade |
|---|---|---|
| 115 | $D_{12}$ | orange |
| 116 | $D_{13}$ | orange |
| 117 | $D_{14}$ | orange |
| 118 | $D_{18}$ | orange |
| 119 | $D_{19}$ | orange |
| 120 | $D_{20}$ | orange |
| 121 | $D_{21}$ | orange |
| 122 | $D_{23}$ | orange |
| 123 | $D_{24}$ | orange |
| 124 | $D_{29}$ | orange |
| 125 | $D_{32}$ | orange |
| 126 | $D_{33}$ | orange |
| 127 | $D_{34a}$ | orange |
| 128 | $D_{34b}$ | orange |
| 129 | $D_{34c}$ | orange |
| 130 | $D_{34e}$ | orange |
| 131 | $D_{34f}$ | orange |
| 132 | $D_{34g}$ | orange |
| 133 | $D_{34i}$ | orange |
| 134 | $D_{34j}$ | orange |
| 135 | $D_{34l}$ | orange |
| 136 | $D_{34m}$ | orange |
| 137 | $D_{34n}$ | orange |
| 138 | $D_{34o}$ | orange |
| 139 | $D_{34q}$ | orange |
| 140 | $D_{34r}$ | orange |

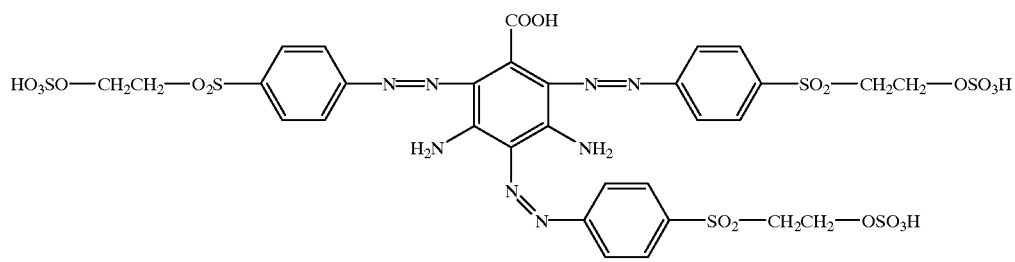

(107)

and dyes cotton and wool in orange colour shades with good allround properties are obtained.

EXAMPLES 115 to 140

The dyes of the general formula (108)

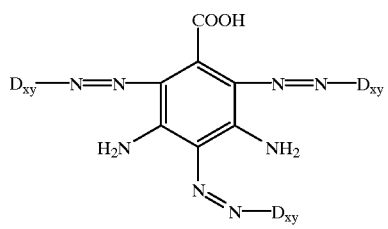

(108)

in which $D_{xy}$ in each case are the radicals listed in Table 5 and these radicals are as defined in Table 1, can be obtained

EXAMPLE 141

14.4 parts of 2-sulfo-4-(β-sulfatoethylsulfonyl)aniline and 22.7 parts of 4-(β-sulfatoethylsulfonyl)aniline are introduced into 120 parts of water and the mixture is stirred thoroughly. First 30 parts of a 4N sodium nitrite solution and then 50 parts of a 31% naphthalenesulfonic acid solution are added to the resulting suspension at 10° C. The mixture is then stirred at 15 to 20 C. for 3 hours. A solution of 6.1 parts of 3,5-diaminobenzoic acid in 40 parts of 2N hydrochloric acid is added to this suspension at 0 to 5° C. The pH of the reaction mixture is brought to 3.2 in the course of one hour at 0 to 5° C. with a 40% sodium acetate solution, to 5.8 in the course of a further hour with sodium bicarbonate and to 7.8 in the course of 45 minutes with a 20% sodium carbonate solution. The resulting solution is evaporated. 66.9 parts of a product which essentially comprises a mixture of compounds which, in the form of the free acid, have the formulae (109), (110), (111), (112), (113) and (114)

(109) 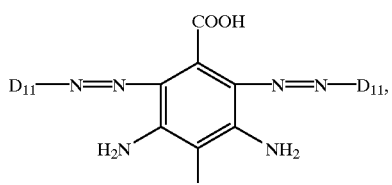

(110) 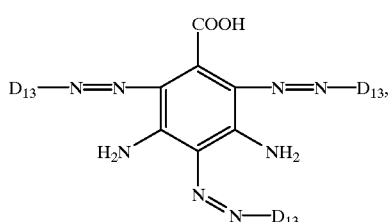

(111) 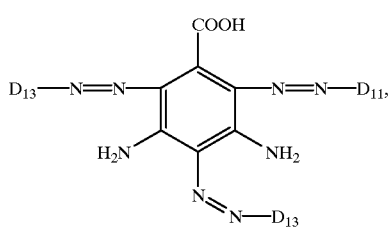

(112) 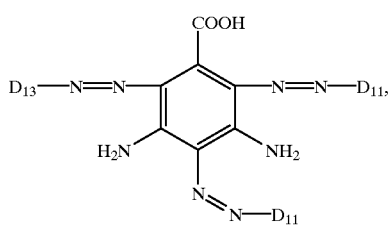

(113) 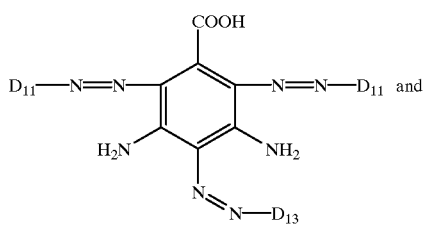

and (114) 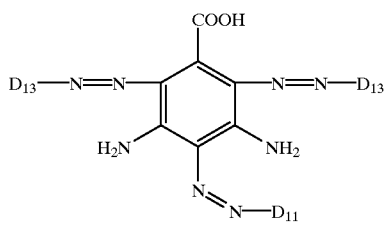

in which $D_{11}$, and $D_{13}$ are as defined in Examples 2 and 4, are obtained. The dye mixture dyes cotton and wool in orange colour shades with good allround properties.

EXAMPLE 142 a) 22.3 parts of 2-aminonaphthalenesulfonic acid are introduced into 215 parts of water and the mixture is stirred thoroughly. 25 parts of a 4N sodium nitrite solution are added to the resulting solution at 0° C. and 20 parts of concentrated hydrochloric acid are then slowly added dropwise at 0 to 5° C. The mixture is stirred at this temperature for 1 hour.

b) 30.3 parts of 2-amino-1,5-naphthalenedisulfonic acid are introduced into 215 parts of water and the mixture is stirred thoroughly. 25 parts of a 4N sodium nitrite solution are added to the resulting solution at 0° C. and 20 parts of concentrated hydrochloric acid are then slowly added dropwise at 0 to 5° C. The mixture is stirred at this temperature for 1 hour.

c) 28.1 parts of 4-(β-sulfatoethylsulfonyl)aniline are introduced into 110 parts of water and the mixture is stirred thoroughly. First 25 parts of a 4N sodium nitrite solution and then 45 parts of a 31% naphthalenesulfonic acid solution are added to the resulting suspension at 10° C. The mixture is then stirred at 15 to 20° C. for 3 hours.

d) 1st coupling: a solution 15.2 parts of 3,5-diaminobenzoic acid in 100 parts of 2N hydrochloric acid is added at 0 to 5° C. to the acid diazo compound suspension obtained according to a). The pH of the reaction mixture is brought to 3.2 in the course of 4 hours with a 40% sodium acetate solution. The mixture is then stirred at 6 to 7° C. for a further 30 minutes.

e) 2nd coupling: the acid diazo compound suspension obtained according to b) is added at 7° C. and pH 3.2 to the suspension obtained according to d). The pH of the reaction mixture is brought to 4.5 in the course of 45 minutes with a 40% sodium acetate solution. The mixture is then stirred at about 15° C. for a further 30 minutes.

f) 3rd coupling: the acid diazo compound suspension obtained according to c) is added at 15° C. and pH 4.5 to the suspension obtained according to e). The pH of the reaction mixture is brought to 6.3 in the course of one hour with sodium bicarbonate. The mixture is then stirred at about 25° C. for a further 45 minutes. 450 parts of acetone are added to the resulting solution, the pH is brought to 1.5 with concentrated hydrochloric acid and 4.6 parts of potassium chloride are added. The product which has precipitated out is filtered off and washed with acetone. 72 parts of a product which essentially comprises a compound which, in the form of the free acid, has the formula (115)

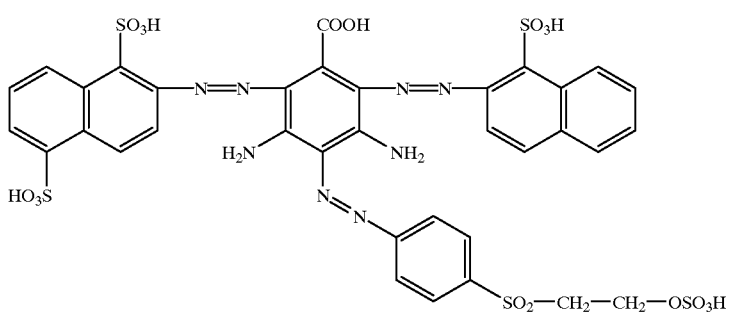

(115)

and dyes cotton and wool in orange colour shades with good allround properties are obtained.

EXAMPLES 143 to 192

Dyes which essentially comprise a compound of the following general formula (116)

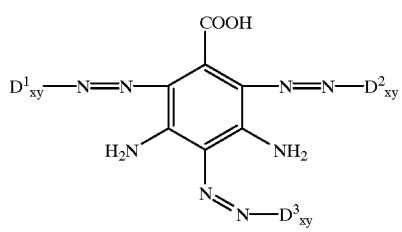

(116)

in which $D^1_{xy}$, $D^2_{xy}$ and $D^3_{xy}$ in each case are the radicals listed in Table 6 and these radicals are as defined in Example 2 and Table 1, can be prepared from the diazo compounds described in Examples 2, 4 and 29 to 33 analogously to the procedure described in Example 142. The dyes dye cotton and wool in the colour shades stated in Table 6 with good allround properties.

TABLE 6

| Exp. | $D^1_{xy}$ 1st coupling | $D^2_{xy}$ 2nd coupling | $D^3_{xy}$ 3rd coupling | Colour shade |
|---|---|---|---|---|
| 143 | $D_{38}$ | $D_{11}$ | $D_{13}$ | brown |
| 144 | $D_{39}$ | $D_{11}$ | $D_{13}$ | brown |
| 145 | $D_{40a}$ | $D_{11}$ | $D_{13}$ | brown-orange |
| 146 | $D_{40b}$ | $D_{11}$ | $D_{13}$ | gold-orange |
| 147 | $D_{40c}$ | $D_{11}$ | $D_{13}$ | gold-orange |
| 148 | $D_{40d}$ | $D_{11}$ | $D_{13}$ | gold-orange |
| 149 | $D_{40e}$ | $D_{11}$ | $D_{13}$ | gold-yellow |
| 150 | $D_{40f}$ | $D_{11}$ | $D_{13}$ | gold-yellow |
| 151 | $D_{41a}$ | $D_{11}$ | $D_{13}$ | red |
| 152 | $D_{41b}$ | $D_{11}$ | $D_{13}$ | red |
| 153 | $D_{41c}$ | $D_{11}$ | $D_{13}$ | red |
| 154 | $D_{41d}$ | $D_{11}$ | $D_{13}$ | red |
| 155 | $D_{41e}$ | $D_{11}$ | $D_{13}$ | red |
| 156 | $D_{41f}$ | $D_{11}$ | $D_{13}$ | red |
| 157 | $D_{41g}$ | $D_{11}$ | $D_{13}$ | red |
| 158 | $D_{41h}$ | $D_{11}$ | $D_{13}$ | red |
| 159 | $D_{41i}$ | $D_{11}$ | $D_{13}$ | red |
| 160 | $D_{41j}$ | $D_{11}$ | $D_{13}$ | red |
| 161 | $D_{41k}$ | $D_{11}$ | $D_{13}$ | red |
| 162 | $D_{41l}$ | $D_{11}$ | $D_{13}$ | red |
| 163 | $D_{41m}$ | $D_{11}$ | $D_{13}$ | red |
| 164 | $D_{41n}$ | $D_{11}$ | $D_{13}$ | red |
| 165 | $D_{41o}$ | $D_{11}$ | $D_{13}$ | red |
| 166 | $D_{41p}$ | $D_{11}$ | $D_{13}$ | red |

TABLE 6-continued

| Exp. | $D^1_{xy}$ 1st coupling | $D^2_{xy}$ 2nd coupling | $D^3_{xy}$ 3rd coupling | Colour shade |
|---|---|---|---|---|
| 167 | $D_{41q}$ | $D_{11}$ | $D_{13}$ | red |
| 168 | $D_{41r}$ | $D_{11}$ | $D_{13}$ | red |
| 169 | $D_{41s}$ | $D_{11}$ | $D_{13}$ | red |
| 170 | $D_{41t}$ | $D_{11}$ | $D_{13}$ | red |
| 171 | $D_{41u}$ | $D_{11}$ | $D_{13}$ | red |
| 172 | $D_{42a}$ | $D_{11}$ | $D_{13}$ | orange |
| 173 | $D_{42b}$ | $D_{11}$ | $D_{13}$ | orange |
| 174 | $D_{42c}$ | $D_{11}$ | $D_{13}$ | orange |
| 175 | $D_{42d}$ | $D_{11}$ | $D_{13}$ | orange |
| 176 | $D_{42e}$ | $D_{11}$ | $D_{13}$ | orange |
| 177 | $D_{42f}$ | $D_{11}$ | $D_{13}$ | orange |
| 178 | $D_{42g}$ | $D_{11}$ | $D_{13}$ | orange |
| 179 | $D_{42h}$ | $D_{11}$ | $D_{13}$ | orange |
| 180 | $D_{42i}$ | $D_{11}$ | $D_{13}$ | orange |
| 181 | $D_{42j}$ | $D_{11}$ | $D_{13}$ | orange |
| 182 | $D_{42k}$ | $D_{11}$ | $D_{13}$ | orange |
| 183 | $D_{42l}$ | $D_{11}$ | $D_{13}$ | orange |
| 184 | $D_{42m}$ | $D_{11}$ | $D_{13}$ | orange |
| 185 | $D_{42n}$ | $D_{11}$ | $D_{13}$ | orange |
| 186 | $D_{42o}$ | $D_{11}$ | $D_{13}$ | orange |
| 187 | $D_{42p}$ | $D_{11}$ | $D_{13}$ | orange |
| 188 | $D_{42q}$ | $D_{11}$ | $D_{13}$ | orange |
| 189 | $D_{42r}$ | $D_{11}$ | $D_{13}$ | orange |
| 190 | $D_{42s}$ | $D_{11}$ | $D_{13}$ | orange |
| 191 | $D_{42t}$ | $D_{11}$ | $D_{13}$ | orange |
| 192 | $D_{42u}$ | $D_{11}$ | $D_{13}$ | orange |

The procedure described in Examples 38 to 108 and 114 to 192 is repeated, except that an equimolar amount of the compound of the formula (117), (118), (119), (120) or (121)

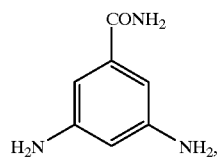

(117)

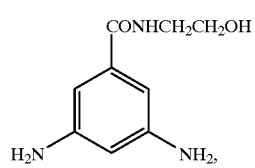

(118)

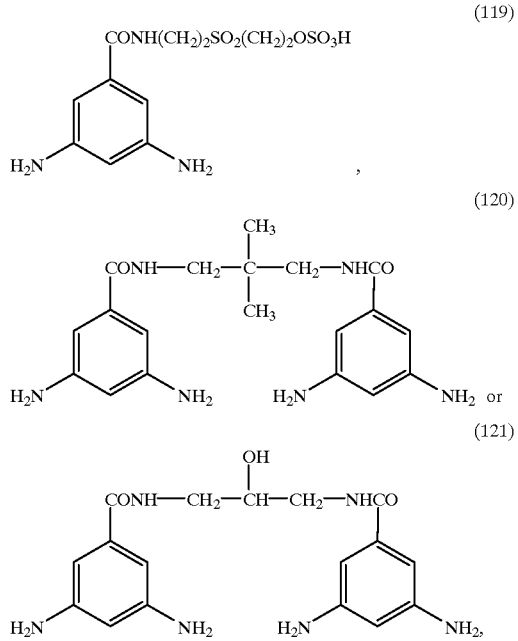

is used in place of 3,5-diaminobenzoic acid. Further valuable dyes which dye cotton and wool with good allround properties can be prepared.

The procedure described in one of Examples 109 to 113 is repeated, except that an equimolar amount of the compound of the formula (117), (118) or (119) is used in place of 3,5-diaminobenzoic acid. Valuable dyes which dye cotton and wool with good allround properties can likewise be prepared.

The compounds of the formulae (117), (118), (119), (120) and (121) are known or can be prepared analogously to known compounds.

Dyeing Instructions I 100 parts of cotton fabric are introduced at 60° C. into 1500 parts of a dyebath which comprises 45 g/l of sodium chloride and 2 parts of the reactive dye obtained according to Example 38. After 45 minutes at 60° C., 20 g/l of calcined sodium carbonate are added. Dyeing is continued at this temperature for a further 45 minutes. Thereafter, the dyed goods are rinsed, soaped at the boil with a nonionic detergent for a quarter of an hour, rinsed again and dried.

As an alternative to the instructions given, dyeing can also be carried out at 80° C. instead of at 60° C.

Dyeing Instructions II 0.1 part of the dye according to Example 38 is dissolved in 200 parts of water, and 0.5 part of sodium sulfate, 0.1 part of a levelling assistant (based on the condensation product of a higher aliphatic amine and ethylene oxide) and 0.5 part of sodium acetate are added. The pH is then brought to a value of 5.5 with acetic acid (80%). The dyebath is heated to 50° C. for 10 minutes and 10 parts of a woollen fabric are then added. The bath is heated to a temperature of 100° C. in the course of about 50 minutes and dyeing is carried out at this temperature for 60 minutes. Thereafter, the bath is allowed to cool to 90° C. and the dyed goods are removed. The woollen fabric is washed with warm and cold water and then spun and dried.

Printing Instructions 3 parts of the dye obtained according to Example 141 are sprinkled with rapid stirring into 100 parts of a stop thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained, dried, and the resulting printed material is steamed in saturated steam at 102° C. for 2 minutes. The printed fabric is then rinsed, can be soaped at the boil and rinsed again, and is then dried.

What is claimed is:

1. An azo dye containing at least one structural unit of the formula (1)

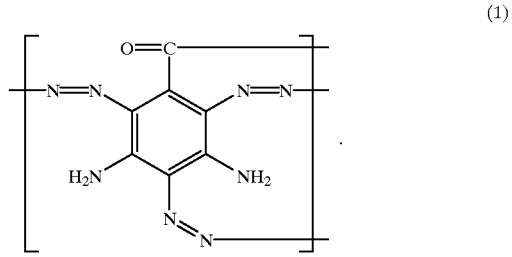

2. An azo dye according to claim 1, which has the formula (2), (3) or (4)

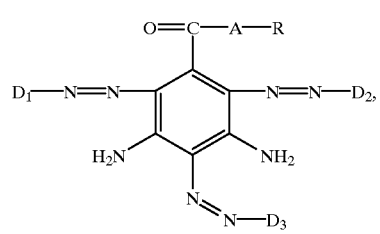

-continued

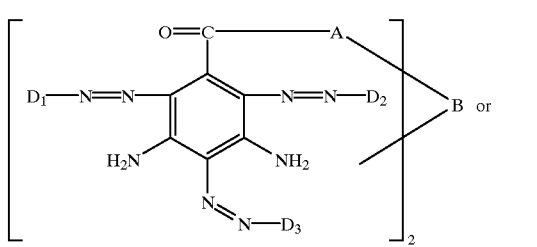

(3)

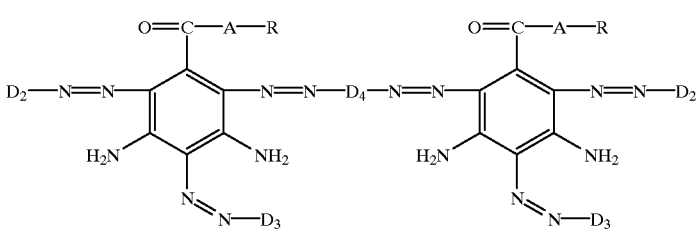

(4)

in which

A is oxygen, sulfur or a radical —NR'— and R' is hydrogen or $C_1$–$C_{12}$alkyl which is substituted or unsubstituted or may be interrupted by oxygen, B is an aliphatic or aromatic bridge member, $D_1$, $D_2$ and $D_3$ independently of one another are each the radical of a diazo component of the benzene or naphthalene series, $D_4$ is the radical of an aromatic tetrazo component and R is hydrogen or an aliphatic or aromatic radical, or the radicals R and R', together with the nitrogen atom, form a heterocyclic radical.

3. An azo dye according to claim 2, in which

A is oxygen or a radical —NR'—.

4. An azo dye of the formula (2) or (4) according to claim 2, in which

A is oxygen and R is hydrogen.

5. An azo dye according to claim 2, which has the formula (2).

6. An azo dye according to claim 2, in which $D_1$, $D_2$ and $D_3$ independently of one another are each a radical of the formula (15) or (16)

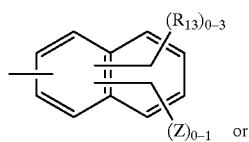

(15)

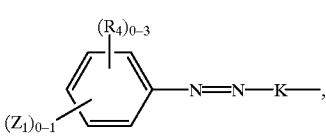

(16)

in which

K is the radical of a coupling component of the formula (17a) or (17b)

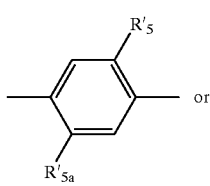

(17a)

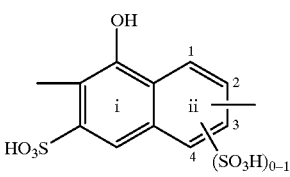

(17b)

and

Z and $Z_1$ independently of one another are a radical of the formula (6a), (6c), (6d), (6e) or (6f)

—$SO_2$—Y (6a),

—$CONR_2$—$(CH_2)_m$—$SO_2$—Y (6c),

—NH—CO—CH(Hal)—$CH_2$—Hal (6d),

—NH—CO—C(Hal)=$CH_2$ (6e),

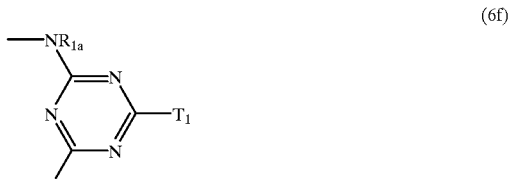

(6f)

in which $R_{1a}$ and $R_2$ are hydrogen,

Hal is bromine,

Y is vinyl, β-chloroethyl or β-sulfatoethyl, $T_1$ is $C_1$–$C_4$alkoxy, $C_1$–$C_4$alkylthio, hydroxyl, amino, N-mono- or N,N-di-$C_1$–$C_4$alkylamino which are unsubstituted or substituted in the alkyl moiety by hydroxyl, sulfato or sulfo, morpholino, phenylamino or N—$C_1$–$C_4$alkyl-N-phenylamino which are unsubstituted or substituted in the phenyl ring by sulfo, carboxyl, acetylamino, chlorine, methyl or methoxy and in which the alkyl is unsubstituted or substituted by hydroxyl, sulfo or sulfato, naphthylamino which is unsubstituted or substituted by 1 to 3 sulfo groups, or a fibre-reactive radical of the formula (7c') or (7d')

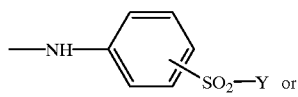
(7c')

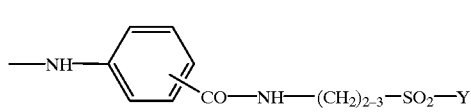
(7d')

and

Y is as defined above, $X_1$ is chlorine or fluorine, m is the number 2 or 3, $(R_4)_{0-3}$ and $(R_{13})_{0-3}$ independently of one another are 0 to 3 identical or different substituents chosen from the group consisting of halogen, $C_1$–$C_4$alkyl, $C_1$–$C_4$alkoxy, carboxyl and sulfo, $R'_5$ is hydrogen, sulfo or $C_1$–$C_4$alkoxy which is unsubstituted or substituted in the alkyl moiety by hydroxyl or sulfato and $R'_{5a}$ is hydrogen, $C_1$–$C_4$alkyl, $C_1$–$C_4$alkoxy, $C_2$–$C_4$alkanoylamino, ureido or a radical of the formula (6f), in which radicals $R_{1a}$, $T_1$ and $X_1$ are as defined above.

7. An azo dye according to claim 6, in which the radicals $D_1$, $D_2$ and $D_3$ independently of one another are each a radical of the formula (15a), (15b), (15c), (15d) or (16a)

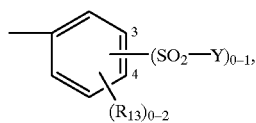
(15a)

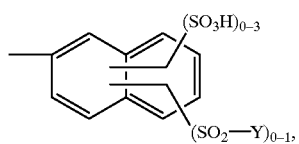
(15b)

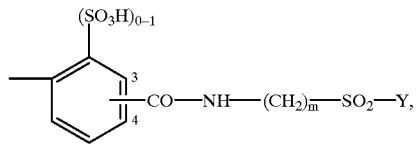
(15c)

-continued

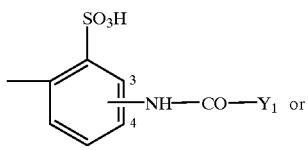
(15d)

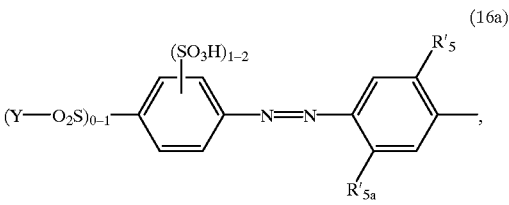
(16a)

in which $R'_5$ is hydrogen, sulfo or ethoxy which is unsubstituted or substituted in the alkyl moiety by hydroxyl or sulfato, $R'_{5a}$ is hydrogen, methyl, ethyl, methoxy, ethoxy, acetylamino, propionylamino or ureido, $(R_{13})_{0-2}$ is 0 to 2 identical or different substituents chosen from the group consisting of halogen, $C_1$–$C_4$alkyl, $C_1$–$C_4$alkoxy and sulfo, $Y_1$ is a group —CH(Br)—$CH_2$—Br or —C(Br)=$CH_2$, Y is vinyl, β-chloroethyl or β-sulfatoethyl and m is the number 2 or 3.

8. An azo dye according to claim 2, in which $D_1$ is a radical of the formula (18)

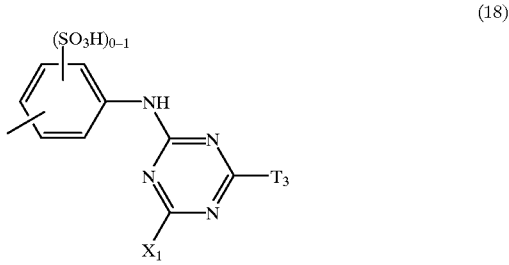
(18)

in which $X_1$ is chlorine or fluorine and $T_3$ is a radical of the formula (10a), (10b), (10d), (10e), (10f), (10k) or (10m)

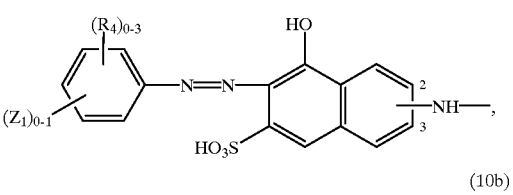
(10a)

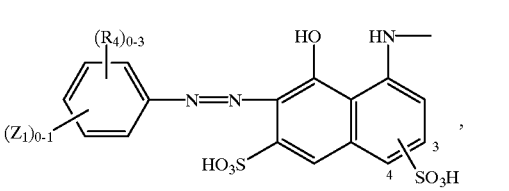
(10b)

-continued

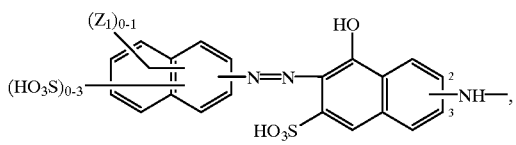
(10d)

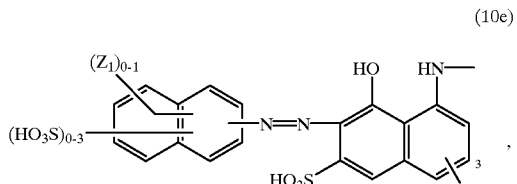
(10e)

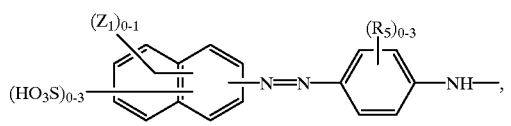
(10f)

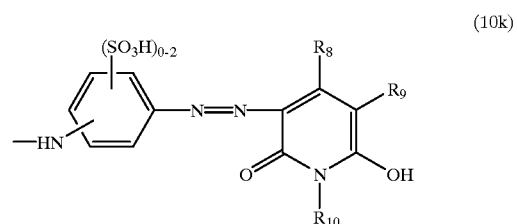
(10k)

or

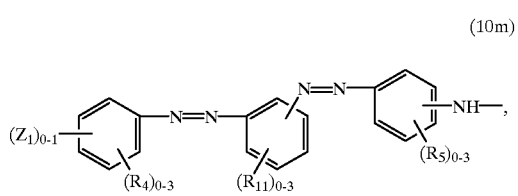
(10m)

in which (R$_4$)$_{0-3}$ is 0 to 3 identical or different substituents from the group consisting of C$_1$–C$_4$alkyl, C$_1$–C$_4$alkoxy, halogen, carboxyl and sulfo, (R$_5$)$_{0-3}$ is 0 to 3 identical or different substituents from the group consisting of halogen, nitro, cyano, trifluoromethyl, sulfamoyl, carbamoyl, C$_1$–C$_4$alkyl, C$_1$–C$_4$alkoxy which is unsubstituted or substituted by hydroxyl, sulfato or C$_1$–C$_4$alkoxy, amino, C$_2$–C$_4$alkanoylamino, ureido, hydroxyl, carboxyl, sulfomethyl, C$_1$–C$_4$alkylsulfonylamino and sulfo, R$_8$ and R$_{10}$ independently of one another are hydrogen, C$_1$–C$_4$alkyl or phenyl and R$_9$ is hydrogen, cyano, carbamoyl or sulfomethyl, (R$_{11}$)$_{0-3}$ is 0 to 3 identical or different substituents from the group consisting of C$_1$–C$_4$alkyl, C$_1$–C$_4$alkoxy, halogen, carboxyl and sulfo and Z$_1$ is a radical of the formula (6a), (6c'), (6d') or (6e')

—SO$_2$—Y (6a),

—CONH—(CH$_2$)$_{2-3}$—SO$_2$—Y (6c'),

—NH—CO—CH(Br)—CH$_2$—Br (6d')

or

—NH—CO—C(Br)=CH$_2$ (6e')

in which Y is vinyl, β-chloroethyl or β-sulfatoethyl; and the radicals D$_2$ and D$_3$ independently of one another are each a radical of the formula (15a), (15b), (15c) or (15d)

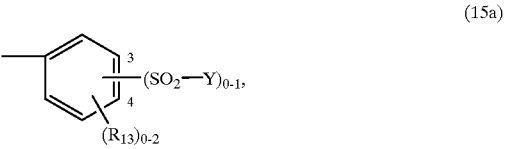
(15a)

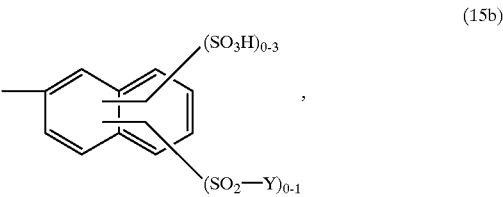
(15b)

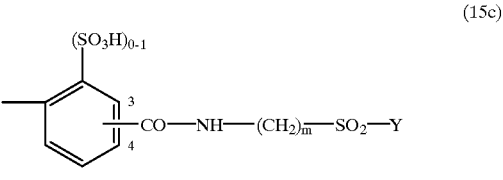
(15c)

or

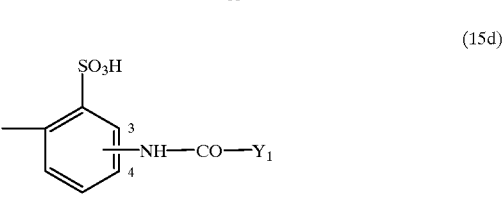
(15d)

in which (R$_{13}$)$_{0-2}$ is 0 to 2 identical or different substituents chosen from the group consisting of halogen, C$_1$–C$_4$alkyl, C$_1$–C$_4$alkoxy and sulfo, Y$_1$ is a group —CH(Br)—CH$_2$—Br or —C(Br)=CH$_2$, Y is as defined above and m is the number 2 or 3.

9. An azo dye according to claim 7, which has the formula (2a)

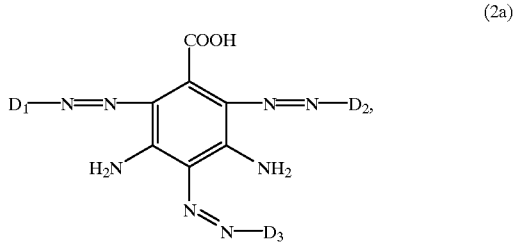
(2a)

in which

D$_1$, D$_2$ and D$_3$ independently of one another in each case are a radical of the formula (15a), (15b), (15c), (15d) or (16a) where at least one of the radicals D$_1$, D$_2$ and D$_3$ contains a fibre-reactive group.

10. An azo dye according to claim 8, which has the formula (2a)

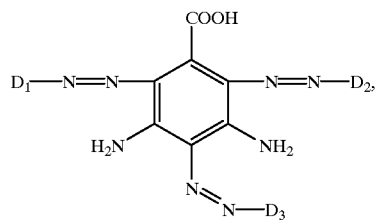
(2a)

in which
- $D_1$ is a radical of the formula (18), in which
  $X_1$ is chlorine and $T_3$ is a radical of the formula (10a), (10b), (10d), (10e), (10f), (10k) or (10m) and
- $D_2$ and $D_3$ independently of one another in each case are a radical of the formula (15a), (15b), (15c) or (15d) where at least one of the radicals $D_2$ and $D_3$ contains a fibre-reactive group.

11. A process for the preparation of an azo dye according to claim 1, which comprises coupling one or more than one diazotized amine together or in any sequence to a compound containing at least one structural unit of the formula (19)

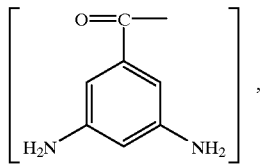
(19)

such that an azo dye which contains at least one structural unit of the formula (1) is obtained.

12. A process for dyeing or printing a fibre material containing hydroxyl groups or nitrogen, which comprises applying to said fibre material an azo dye of formula (1) according to claim 1.

13. A process according to claim 12, wherein said fibre material is cellulosic fibre material.

14. A process according to claim 12, wherein said fibre material is cotton.

* * * * *

UNITED STATES PATENT AND TRADEMARK OFFICE
CERTIFICATE OF CORRECTION

PATENT NO. : 6,160,101
DATED : December 12, 2000
INVENTOR(S) : Athanassios Tzikas et al.

It is certified that error appears in the above-identified patent and that said Letters Patent is hereby corrected as shown below:

On the title page, Section [30] should read:
--[30] Foreign Application Priority Data
      Mar. 11, 1999 Europe [EPO]....................99810220.6

Signed and Sealed this

Tenth Day of July, 2001

*Attest:*

NICHOLAS P. GODICI
*Attesting Officer*     *Acting Director of the United States Patent and Trademark Office*